(12) United States Patent
Desikachari et al.

(10) Patent No.: US 11,275,667 B2
(45) Date of Patent: Mar. 15, 2022

(54) HANDLING OF WORKLOAD SURGES IN A SOFTWARE APPLICATION

(71) Applicant: APPNOMIC SYSTEMS PRIVATE LIMITED, Bengaluru (IN)

(72) Inventors: Padmanabhan Desikachari, Bangalore (IN); Pranav Kumar Jha, Bangalore (IN)

(73) Assignee: APPNOMIC SYSTEMS PRIVATE LIMITED, Bengaluru (IN)

( * ) Notice: Subject to any disclaimer, the term of this patent is extended or adjusted under 35 U.S.C. 154(b) by 171 days.

(21) Appl. No.: 16/792,914

(22) Filed: Feb. 18, 2020

(65) Prior Publication Data

US 2021/0096977 A1    Apr. 1, 2021

(30) Foreign Application Priority Data

Sep. 27, 2019   (IN) .............................. 201941039141

(51) Int. Cl.
   *G06F 11/34*   (2006.01)
   *G06F 17/18*   (2006.01)
   (Continued)

(52) U.S. Cl.
   CPC .......... *G06F 11/3442* (2013.01); *G06F 9/466* (2013.01); *G06F 11/302* (2013.01);
   (Continued)

(58) Field of Classification Search
   CPC ........................... G06F 11/3442; G06N 20/00
   (Continued)

(56) References Cited

U.S. PATENT DOCUMENTS 7,836,446 B2   11/2010 Ode
8,543,711 B2    9/2013 Rolia et al.
(Continued)

FOREIGN PATENT DOCUMENTS

JP    4821132 B2    11/2011

OTHER PUBLICATIONS

Eduardo Javier Huerta Yero et al., "Contention-sensitive static performance prediction for parallel distributed applications", vol. 63, Issues 4-5, May 2006, pp. 265-277.
(Continued)

*Primary Examiner* — Ricky Go
(74) *Attorney, Agent, or Firm* — IPHorizons PLLC; Narendra Reddy Thappeta

(57) ABSTRACT

According to an aspect of the present disclosure, a correlation data correlating resource usage with workload signatures is maintained, each workload signature representing a cluster of block signatures, each block signature characterizing the transaction instances initiated in a corresponding block duration. For the transactions received in a current block duration, if a current block signature is not contained in the correlation data and if the current transaction arrival rate (TAR) is greater than an expected TAR, a resource requirement for the current block signature is computed. Actions to manage capacity to handle transaction instances are triggered if the resource requirement is greater than the resource allocation in the current block duration. As an unknown current block signature and a higher TAR may be indicative of a workload surge, triggering suitable actions for such block signatures facilitates such surges to be handled by the software application.

22 Claims, 17 Drawing Sheets

(51) Int. Cl.
  *G06N 20/00* (2019.01)
  *G06F 9/46* (2006.01)
  *G06F 11/30* (2006.01)

(52) U.S. Cl.
  CPC ...... *G06F 11/3409* (2013.01); *G06F 11/3423* (2013.01); *G06F 11/3466* (2013.01); *G06F 11/3495* (2013.01); *G06F 17/18* (2013.01); *G06N 20/00* (2019.01)

(58) Field of Classification Search
  USPC .......................................................... 702/186
  See application file for complete search history.

(56) References Cited

U.S. PATENT DOCUMENTS

| 8,756,610 | B2 | 6/2014 | Dasgupta et al. |
| 8,903,757 | B2 | 12/2014 | Desikachari |
| 9,755,923 | B2 | 9/2017 | Cama et al. |
| 10,198,340 | B2 | 2/2019 | Vesepogu et al. |
| 2010/0094592 | A1* | 4/2010 | Cherkasova ........ G06F 11/3466 702/182 |
| 2015/0074035 | A1 | 3/2015 | Narasappa |
| 2015/0113120 | A1 | 4/2015 | Jacobson et al. |
| 2015/0142414 | A1 | 5/2015 | Desikachari |
| 2015/0278061 | A1 | 10/2015 | Siciliano et al. |
| 2015/0310139 | A1 | 10/2015 | Desikachari et al. |

OTHER PUBLICATIONS

Ran Xu (Purdue) et al., "PYTHIA: Improving Datacenter Utilization via Precise Contention Prediction for Multiple Co-located Workloads", https://engineering.purdue.edu/dcsl/presentations1/2018/pythia_middleware18.pdf, downloaded circa Aug. 30, 2019, 10 pages.

Waheed Iqbal et al., "Dynamic Workload Patterns Prediction for Proactive Auto-scaling of Web Applications", Journal of Network and Computer Applications, Sep. 2018, 26 pages.

* cited by examiner

| Time | Txn_LOGIN_AvgRespTime | Txn_LOGIN_Total | Txn_LOGOUT_AvgRespTime | Txn_LOGOUT_Total | ... | Txn_Booking_AvgRespTime | Txn_Booking_Total | ... |
|---|---|---|---|---|---|---|---|---|
| 1/12/2016 0:01 | | | 34.3935 | 1.51033 | ... | 11 | 2 | ... |
| 1/12/2016 0:02 | 3.068 | 2 | 24.3418 | 1.739 | ... | 68 | 13 | ... |
| 1/12/2016 0:03 | 1.792 | 1 | 38.405 | 4.926 | ... | 505 | 86 | ... |
| 1/12/2016 0:04 | | | | 3.54267 | ... | 1,977 | 383 | ... |
| 1/12/2016 0:05 | | | | 186.418 | ... | 2,533 | 724 | ... |
| . . . | . . . | . . . | . . . | . . . | . . . | . . . | . . . | . . . |
| 1/12/2016 0:23 | | | 27.6421 | 1.025 | ... | 4,977 | 383 | ... |
| 1/12/2016 0:24 | 33.102 | 1 | 27.0773 | 7.339 | ... | 17,533 | 724 | ... |

| Signature ID | Txn_LOGIN | Txn_LOGOUT | Txn_Search_Flight | Txn_Select_Flight | Txn_Search_Hotel | Txn_Select_Hotel | Txn_Booking | Txn_Payment |
|---|---|---|---|---|---|---|---|---|
| S1 | 2 | 1 | 2 | - | 9 | 6 | 11 | 2 |
| S2 | 13 | - | 4 | 3 | 16 | 14 | 68 | 3 |
| S3 | 86 | 5 | 29 | 12 | 155 | 51 | 505 | 14 |
| S4 | 383 | 15 | 152 | 32 | 689 | 203 | 4,977 | 136 |
| S5 | 724 | 35 | 1,022 | 247 | 5,206 | 373 | 17,533 | 1,086 |

620

| Signature ID | Txn_LOGIN | Txn_LOGOUT | Txn_Search_Flight | Txn_Select_Flight | Txn_Search_Hotel | Txn_Select_Hotel | Txn_Booking | Txn_Payment | Bt_Cleanup | Bt_Account |
|---|---|---|---|---|---|---|---|---|---|---|
| S1 | 2 | 1 | 2 | - | 9 | 6 | 11 | 2 | 0.10 | |
| S2 | 13 | - | 4 | 3 | 16 | 14 | 68 | 3 | | 0.35 |
| S3 | 86 | 5 | 29 | 12 | 155 | 51 | 505 | 14 | 0.47 | |
| S4 | 383 | 15 | 152 | 32 | 689 | 203 | 4,977 | 136 | | |
| S5 | 724 | 35 | 1,022 | 247 | 5,206 | 373 | 17,533 | 1,086 | | |

| Time | CPU_UTIL | DISK_IOREAD | DISK_IOWRITE | EC_CPU_UTIL | ... | CURRENT_OPEN_CURSORS | LOCKS_WAITS | ... |
|---|---|---|---|---|---|---|---|---|
| 1/12/2016 0:01 | 28.8571 | 141.36 | 971.1 | 21.51033 | ... | 59810 | 0 | ... |
| 1/12/2016 0:02 | 13.068 | 212.2 | 24.3418 | 31.739 | ... | 59873 | 2 | ... |
| 1/12/2016 0:03 | 16.792 | 112.5 | 38.405 | 54.926 | ... | 60772 | 0 | ... |
| 1/12/2016 0:04 | 24.55 | 45.55 | 235.35 | 63.54267 | ... | 61374 | 10 | ... |
| 1/12/2016 0:05 | | 564.5 | 153.8 | 86.418 | ... | 61771 | 19 | ... |
| ... | ... | ... | ... | ... | ... | ... | ... | ... |
| 1/12/2016 0:23 | 17.49 | 5025.5 | 92.6421 | 91.025 | ... | 61798 | 16 | ... |
| 1/12/2016 0:24 | 33.102 | 602.54 | 87.0773 | 70.339 | ... | 61811 | 85 | ... |

| Signature_ID | CPU_UTIL_MEAN | CPU_UTIL_SD | DISK_IOREAD_MEAN | DISK_IOREAD_SD | ... | LOAD_AVERAGE_MEAN | LOAD_AVERAGE_SD | ... |
|---|---|---|---|---|---|---|---|---|
| S1 | 23.1172 | 5.2428 | 16,677.1200 | 7,170.9795 | ... | 8.3114 | 1.4967 | ... |
| S2 | 33.0000 | 6.0000 | 20,396.0000 | 9,547.0000 | ... | 11.0000 | 2.0000 | ... |
| S3 | 40.0000 | 9.0000 | 23,153.0000 | 10,792.0000 | ... | 12.0000 | 3.0000 | ... |
| S4 | 58.0000 | 13.0000 | 31,086.0000 | 10,792.0000 | ... | 12.0000 | 3.0000 | ... |
| S5 | 87.0000 | 13.0000 | 36,580.0000 | 18,065.0000 | ... | 12.0000 | 4.0000 | ... |

HANDLING OF WORKLOAD SURGES IN A SOFTWARE APPLICATION

PRIORITY CLAIM

The instant patent application is related to and claims priority from the co-pending India provisional patent application entitled, "APPLICATION PERFORMANCE IN INFORMATION TECHNOLOGY INFRASTRUCTURE", Serial No.: 201941039141, Filed: 27 Sep. 2019, which is incorporated in its entirety herewith.

BACKGROUND OF THE DISCLOSURE

Technical Field

The present disclosure relates to IT infrastructure and more specifically to handling workload surges in a software application.

Related Art

Software applications are deployed in computing infrastructures to process a large number of user requests. The computing infrastructures can be cloud infrastructures, enterprise infrastructure, a hybrid of cloud and enterprise infrastructures, as is well known in the relevant arts.

Processing of user requests causes a corresponding workload for a software application. Typically, some of the interactions between a user and a software application may be processed in the front end at the end user systems from which the users access the application, while many of the user interactions may result in transaction requests that would be required to be processed in the backend by the software application. The workloads of interest here are such transactions that are to be processed by the software applications.

There are often surges in the workloads for a software application in various durations. A surge refers to either substantial increase or reduction in the quantum of workload for the software application. In general, substantial increases are of particular concern because the response times for various interactions may become unacceptably large, or in an even worse scenario the software application may become inoperable.

Accordingly, there is a general need to appropriately handle workload surges in a software application.

BRIEF DESCRIPTION OF THE DRAWINGS

Example embodiments of the present disclosure will be described with reference to the accompanying drawings briefly described below.

FIG. 6A is a transaction table depicting real-time metrics captured for various transactions that have occurred in a block duration during the operation of a software application, in one embodiment.

FIG. 6B is a signature table depicting the work load signatures identified for a software application in one embodiment.

FIG. 6C is a real-time resource usage table depicting the usage of the resources in different sub-blocks of a block duration while processing of transactions in the block duration in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
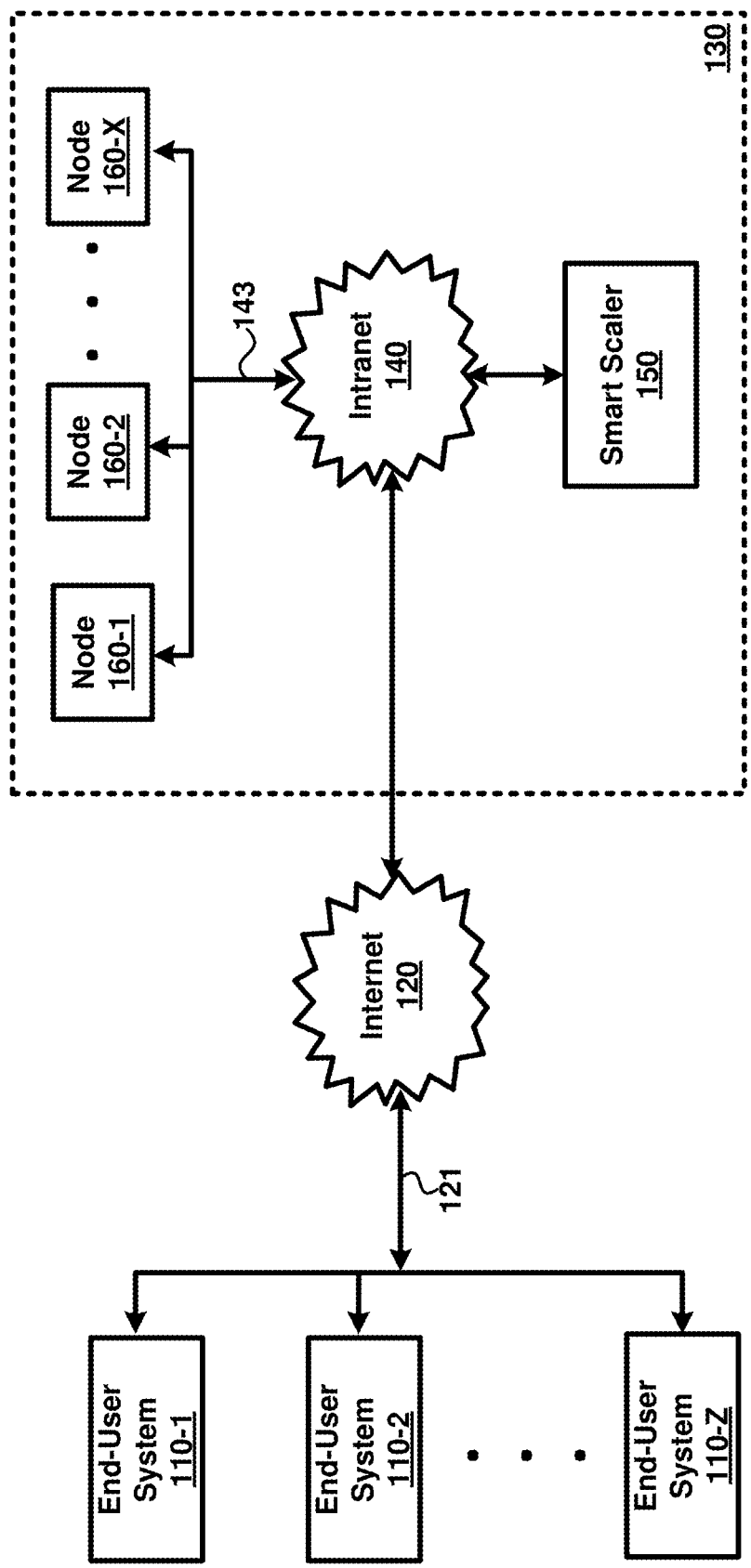
FIG. 1 is a block diagram illustrating an example environment (computing system) in which several aspects of the present invention can be implemented.

An aspect of the present disclosure facilitates handling of workload surges in a software application supporting multi-stage user journeys. In an embodiment, a system maintains a correlation data correlating resource usage with different workload signatures, wherein each workload signature represents a cluster of block signatures, wherein each block signature characterizes the transaction instances initiated by user journeys in a corresponding block duration. In one embodiment, each block signature indicates the corresponding number of occurrences of transactions instances of each transaction type in the corresponding block duration.

The system determines a current block signature and a current transaction arrival rate (TAR) for transactions received in a current block duration. If the current block signature is not contained in the correlation data and if the current TAR is greater than an expected TAR for the current block duration, the system computes a resource requirement for the current block signature based on respective transaction instances for each transaction type in the current block signature. The system then compares the resource requirement and a resource allocation in the current block duration and triggers actions to manage capacity to handle transaction instances if the comparing determines that the resource requirement is greater than the resource allocation in the current block duration.

It may be appreciated that an unknown current block signature and a higher transaction arrival rate may be indicative of a workload surge, that is, an unexpected workload that the software application may not be able to handle with currently allocated resources. Accordingly suitable capacity management actions (e.g., increasing the processing capability of the software application or throttling the creation of workload) may be triggered to handle such unexpected workload surges by the software application.

According to another aspect of the present disclosure, the maintaining of the correlation data is performed by identifying multiple workload signatures based on a prior set of block signatures corresponding to prior block durations, and then forming the correlation data for the multiple workload signatures based on the actual resource usage in the corresponding prior block durations. Accordingly, if the current block signature is not contained in the correlation data and if the current TAR is not greater than the expected TAR or if the resource requirement is less than the resource allocation, the system adds the current block signature to the prior set of block signatures, and performs again the actions of identifying and the forming.

Thus, even for unknown current block signatures, when the system determines (is confident) that the resource allocation for the current block duration can handle the unexpected workloads, the system merely incorporates the block signatures into the correlation data indicative of the successful handling of the unexpected workload/workload surge.

According to one more aspect of the present disclosure, the system (noted above) generates a machine learning (ML) based capacity model using the correlation data. The system then computes/predicts the resource requirement based on the ML capacity model.

According to an aspect of the present disclosure, the software application contains multiple components hosted on one or more nodes of a computing infrastructure, with each node providing resources for the components hosted on the node. In response to determining that the current block signature is not contained in the correlation data and if the current TAR is greater than an expected TAR for the current block duration, the system computes a node resource requirement for each of the nodes, and then compares the node resource requirement of each node with the node resource currently allocated in the node. Actions are triggered only if the node resource requirement is greater than the node resource allocated for at least one node hosting the software application.

According to another aspect of the present disclosure, the system (noted above) maintains correlation data for each node of the one or more nodes hosting the software application. The system generates a machine learning (ML) usage model for each node-resource combination based on the correlation data. The system then computes/predicts the node resource requirement for each of the nodes based on the ML usage model.

According to one more aspect of the present disclosure, each workload signature characterizes both of the transactions initiated by user journeys and the backend processes (e.g., batch jobs) executed in the software application in respective block durations. The current block signature identified by the system accordingly further characterizes the backend processes currently executing in the software application in the current block duration. Accordingly, the computing of the resource requirement is performed based on both the transactions received due to user journeys in the current block duration and the backend processes currently executing in the current block duration. In addition, the actions triggered include deferring the backend process/batch job executing in the current block duration to a later time duration.

According to an aspect of the present disclosure, upon an indication of a workload surge (unknown current block signature and a higher transaction arrival rate), the system (noted above) performs the action of throttling the workload for upcoming (after the current) block durations thereby ensuring that the resource allocation for the current block duration is enabled to handle the (reduced) workload.

According to another aspect of the present disclosure, for triggering actions, the system (noted above) determines whether a resource can be allocated dynamically. If the resource can be allocated dynamically, the system performs the action of provisioning the resource. Alternatively, the system performs the action of throttling the workload for upcoming block durations.

According to yet another aspect of the present disclosure, the system (noted above) displays a burn map indicating the usage of various resources for multiple block durations including the current block duration. The burn map highlights a set of resources whose requirements are above respective thresholds for each of the block durations. In one embodiment, the burn map further highlights the set of nodes where the requirement for a resource is above the respective threshold for the resource in each of the block durations.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing end-user systems 110-1 through 110-Z (Z representing any natural number), Internet 120 and computing infrastructure 130. Computing infrastructure 130 in turn is shown containing intranet 140, smart scaler 150 and nodes 160-1 through 160-X (X representing any natural number). The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications.

Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand. Alternatively, computing infrastructure 130 may correspond to an enterprise system (or a part thereof) on the premises of the customers. Computing infrastructure 130 may also be a "hybrid" infrastructure containing some nodes of a cloud infrastructure and other nodes of an enterprise system. The description is continued assuming that computing infrastructure 130 is a cloud infrastructure and accordingly the terms "computing infrastructure 130" and "cloud infrastructure 130" are used interchangeably in the description hereafter.

All the nodes (160) of computing infrastructure 130 are assumed to be connected via an intranet 140. Internet 120 extends the connectivity of these (and other systems of the computing infrastructure) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

Each of nodes 160 has a fixed number of resources such as memory (RAM), CPU (central processing unit) cycles, persistent storage, etc. that can be allocated to (and accordingly used by) software applications (or components thereof) executing in the node. Other resources that may also be provided associated with the cloud infrastructure (but not specific to a node) include public IP (Internet Protocol) addresses, etc. In addition to such infrastructure resources, application resources such as database connections, application threads, etc. may also be allocated to (and accordingly used by) the software applications (or components thereof).

In one embodiment, each customer/tenant is provided with a corresponding virtual computing infrastructure (referred to as a "cloud") hosted on nodes 160 of cloud infrastructure 130. Each customer may host desired software applications/data services on their cloud(s), which are capable of processing user requests received from end-user systems 110. The manner in which software applications are hosted in a cloud/computing infrastructure is described below with examples.

3. Software Applications in Cloud

Figure 2A:
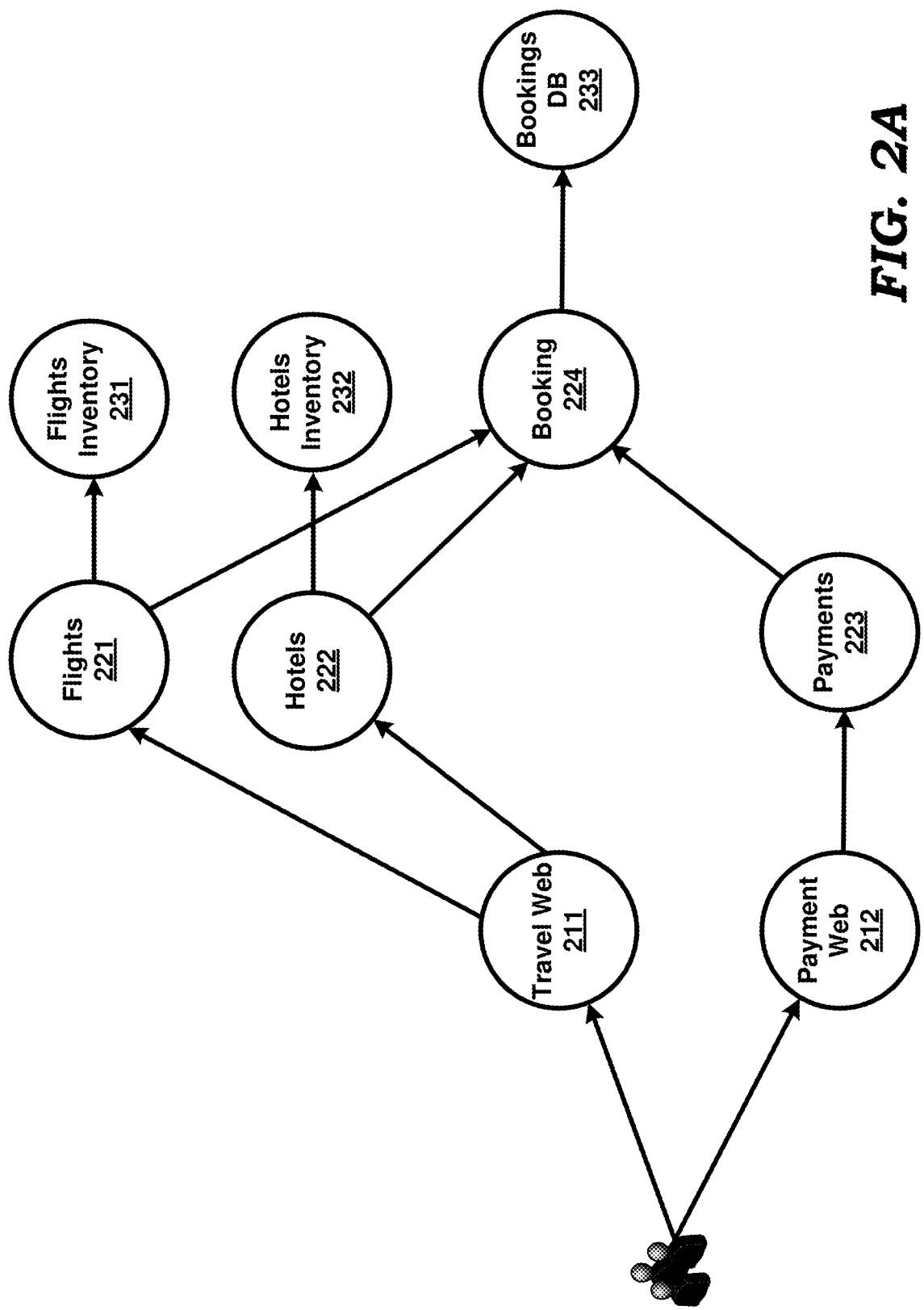
FIG. 2A depicts the components of a software application in one embodiment.

FIG. 2A depicts the components of a software application in one embodiment. For illustration, the software application is assumed to be an online travel application that enables users to search and book both flights and hotels. The online travel application is shown containing multiple components such as portals 211-212 (travel web and payment web respectively), internal/application services 221-224 (flights, hotels, payments and booking respectively) and data stores 231-233 (flights inventory, hotels inventory and bookings DB respectively). It may be appreciated that a software application may contain less or more components, differing in number and type, depending on the implementation of the software application.

Each of portals 211 and 212 represents a software component that is designed to process user requests received from external systems (such as end-user systems 110) connected to Internet 120 and send corresponding responses to the requests. For example, Travel Web portal 211 may receive (via path 122) user requests from a user using end-user system 110-2, process the received user requests by invoking one or more internal/application services (such as 221-223), and the results of processing as corresponding responses to end-user systems 110-2. The responses may include appropriate user interfaces for display in the requesting end-user system (110-2). Payment Web portal 212 may similarly interact with end-user system 110-2 and facilitate the user to make online payments.

Each of services 221-224 represents a software component that implements corresponding functionalities of the software application. Example of services are Flights service 231 providing the functionality of search of flights, Hotels service 222 providing the functionality of search of hotels, etc. A service (e.g. Flights service 221) may access/invoke other services (e.g. Booking service 224) and/or data stores (e.g. Flights Inventory 231) for providing the corresponding functionality.

Each of data stores 231-233 represents a storage component that maintains data used by other components of the software application. As noted above, each of the data stores may be implemented as a database server or file system based on the implementation of the software application.

The manner in which the various components of the software application (online travel application) is hosted in a cloud/computing infrastructure 130 is described below with examples.

In one embodiment, virtual machines (VMs) form the basis for executing various software applications in processing nodes/server systems of cloud infrastructure 130. As is well known, a virtual machine may be viewed as a container in which software applications (or components thereof) are executed. A processing node/server system can host multiple virtual machines, and the virtual machines provide a view of a complete machine (computer system) to the enterprise applications executing in the virtual machine. Thus, when multiple VMs are hosted on a single node, the resources (of the node) are shared by the VMs.

Figure 2C:
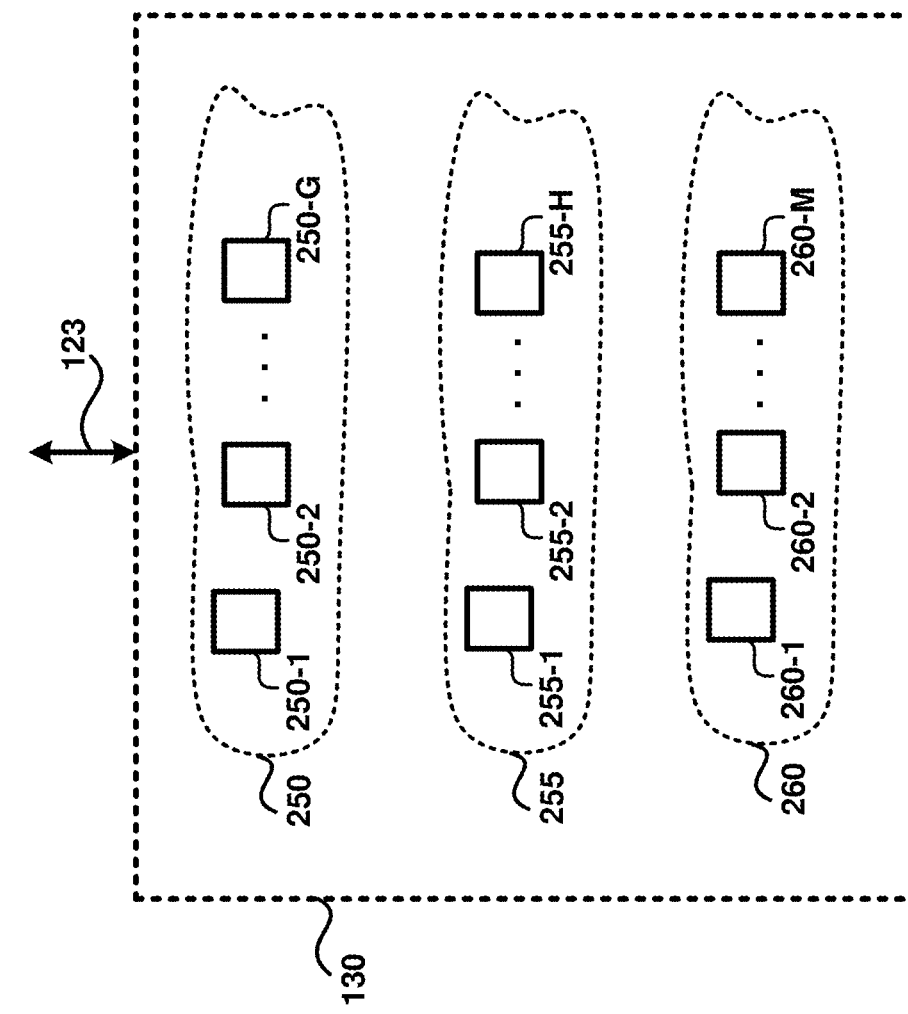
FIG. 2C illustrates the manner in which multiple clouds (and correspondingly software applications) are hosted in a cloud infrastructure in one embodiment.
Figure 2B:
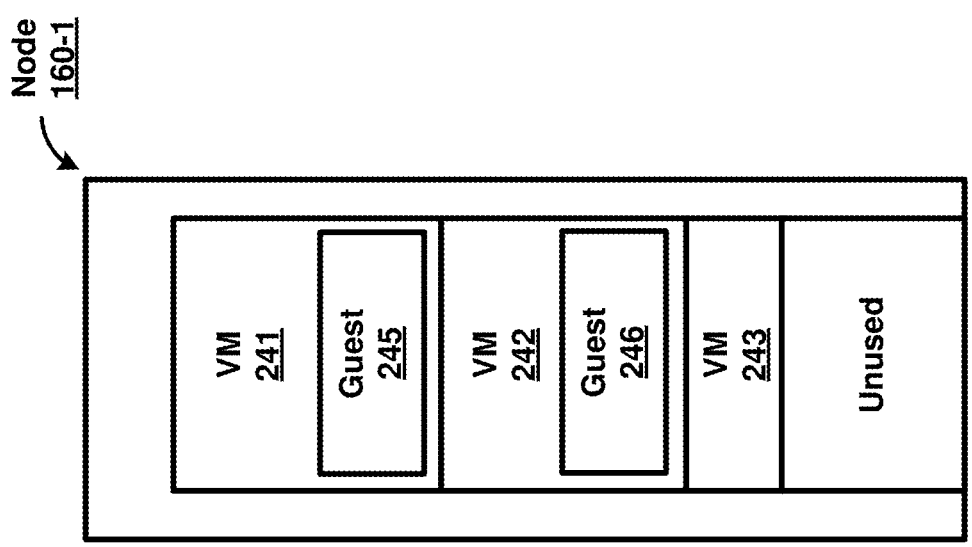
FIG. 2B illustrates an example state of a node in a cloud infrastructure.

FIG. 2B illustrates an example state of a node in a cloud infrastructure. Node 160-1 is shown hosting VMs 241, 242, and 243, with the resources of the node shown allocated among the three VMs and some resources shown as still remaining 'unused' (i.e., not provisioned for any execution entity within node 160-1). Some of VMs 241 and 242 is shown hosting guest (modules) 245 and 246. Guest modules 221/222 may correspond to one of software components (such as 211-212, 221-224 and 231-233) of the software application deployed in cloud infrastructure 130. Similarly, other VMs may be hosted in the other nodes of cloud infrastructure 130 and form the basis for deploying other software applications.

Each VM is associated with a resource definition which specifies the resources allocated to/used by the VM during its operation. The resource definition typically is in the form of a triplet C, M, S, where C is the number of CPU cycles (e.g. 1×, 2×, 4×), M is the amount of memory (RAM) in gigabytes (e.g. 1 GB, 2 GB, 4 GB) and S is the amount of persistent storage in gigabytes (e.g. 50 GB, 100 GB, 200 GB).

In one embodiment, a cloud for a customer/tenant is provisioned (created) by allocating a desired number of VMs hosted on nodes 160 in cloud infrastructure 130. Each VM in the cloud may have a corresponding resource definition. Multiple VMs may also have the same resource definition. The manner in which multiple clouds are provisioned in cloud infrastructure 130 is described below with examples.

FIG. 2C illustrates the manner in which multiple clouds (and correspondingly software applications) are hosted in a cloud infrastructure in one embodiment. Specifically, cloud infrastructure 130 is shown hosting clouds 250, 255 and 260. Cloud 250 is shown containing VMs 250-1 through 250-G (G representing any natural number) that may be provisioned on the different nodes 160 of cloud infrastructure 130.

Similarly, clouds 255 and 260 are shown respectively containing VMs 255-1 through 255-H and 260-1 through 260-M (H and M representing any natural number). For illustration, it is assumed that each cloud (250, 255 and 260) hosts a corresponding software application (including multiple instances of the software components).

The manner in which components of a software application are deployed in a corresponding cloud (250, 255, and 260) is described below with examples.

Figure 2D:
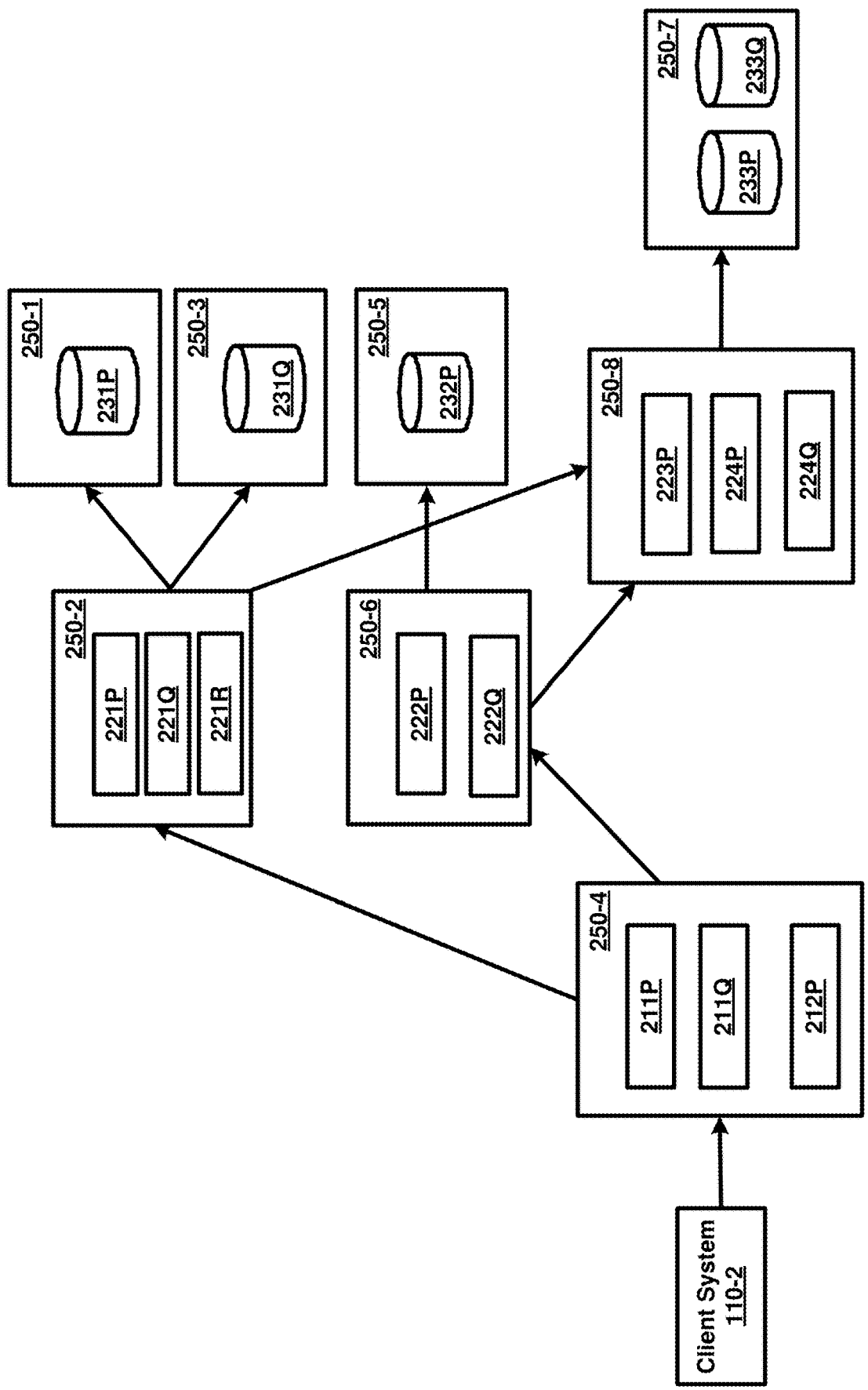
FIG. 2D depicts the manner in which components of a software application are deployed in a cloud in one embodiment.

FIG. 2D depicts the manner in which components of a software application are deployed in a cloud in one embodiment. In particular, the Figure depicts the manner in which the components of an online travel application shown in FIG. 2A are deployed in cloud 250 of FIG. 2C. For illustration, it is assumed that the components are deployed in eight VMs (i.e., G=8) provisioned as part of cloud 250.

Some of the components are shown having multiple instances, each instance representing a separate execution of the component. Such multiple instances may be necessitated for load balancing, throughput performance, etc. as is well known. Each instance (indicated by the suffix P, Q, R, etc.) is shown hosted and executing in a corresponding VM provisioned on nodes 160 of cloud infrastructure 130. For example, portal 211 is shown having two instances 211P and 211Q deployed on VM 250-4 of cloud 250.

Thus, a software application (online travel application) is hosted in cloud 250/computing infrastructure 130. During operation of the online travel application, a user using end-user system 110-2, may send various user requests for desired tasks such as searching for flights, selecting a flight (from a results of the search), booking a selected flight, etc. The processing of these user requests causes various software components to be invoked, which in turn may cause storage components to be accessed. The execution/access of the software/storage components may in turn consume resources (such computing, storage and networking) of cloud infrastructure 130. The relationship between the user interactions and the resource usage is described below with examples.

Figure 2E:
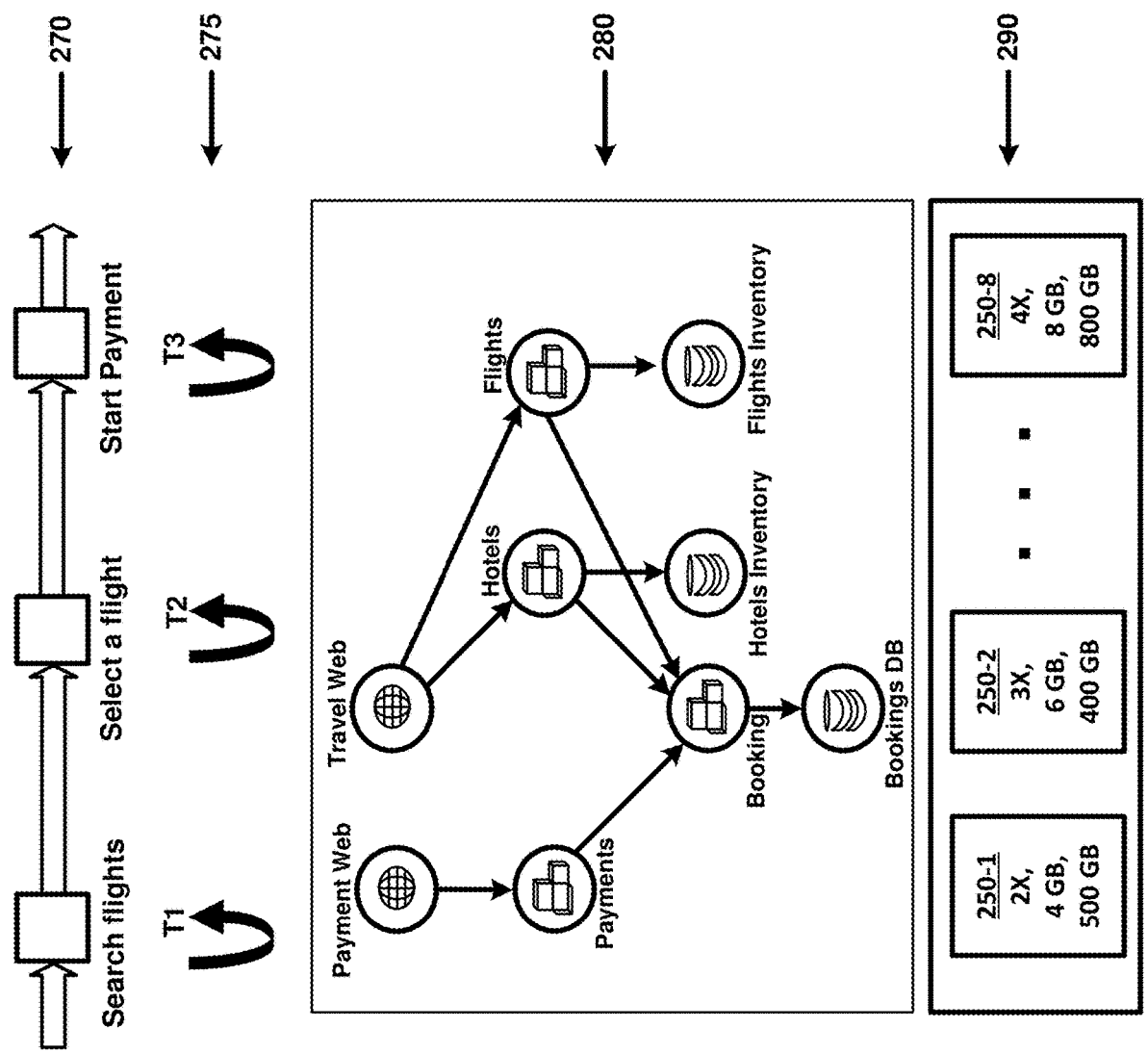
FIG. 2E depicts the relationship between the user interactions in a software application and the resource usage in a computing infrastructure in one embodiment.

FIG. 2E depicts the relationship between the user interactions with a software application and the resource usage in a computing infrastructure in one embodiment. User journeys 270 represent the various multi-stage user journeys that are conducted by users with a software application (here, the online travel application). A user journey represents a sequence of interactions a user conducts with a software application. A logical subset of interactions of the sequence is together viewed as a stage in the journey, with each such stage providing a corresponding functionality for the user. In the case of an online travel application, a user may be provided functionalities such as searching for flights, selection of one of the flights in the search results, and booking a ticket for the selected flight. The sequence of these three (in general, N) stages may be viewed as a single user journey (of three/N stages).

Some of the user interactions may be processed in the front end at the end user systems 110 from which the users access the application, while many of the user interactions may result in transaction requests that would be required to be processed in the backend by the software application.

Transactions 275 are initiated by the user interactions as a part of respective journeys. Each transaction (T1, T2, etc.) implies receipt of a corresponding user request that is to be processed by components 280, and a response is shown being provided to complete processing of the transaction. In the following disclosure, each transaction is viewed as being a corresponding "transaction instance" of a respective "transaction type".

Components 280 represent the software components implementing the various functionalities of a software application. Components 280 is shown including both the front-end facing portals 211-212 as well as internal services 221-224 and data stores 231-233.

Infrastructure 290 provides the infrastructure resources (such computing, storage and networking) utilized during operation of the software application. In one embodiment, the resources utilized are computed based on the resources allocated to the different VMs (e.g. 250-1, 250-2, etc.) hosting the software application in cloud infrastructure 130. Accordingly, each VM is shown along with its resource definition in 290.

Thus, interactions of users during user journeys 270 cause transactions to be initiated. The transactions constitute a workload for the software application. The transactions are processed by invocation of one or more software components. The operation of software components requires and uses infrastructure resources in 290. Any change in the workload (e.g., surges) would affect the resource usage and needs to be accordingly handled.

Smart scaler 150, provided according to several aspects of the present disclosure, facilitates handling of workload surges in a software application. Though shown internal to computing infrastructure 130, in alternative embodiments, smart scaler 150 may be implemented external to computing infrastructure 130, for example, as a system connected to Internet 120. The manner in which smart scaler 150 facilitates handling of workload surges is described below with examples.

5. Handling Workload Surges in a Software Application

Figure 3A:
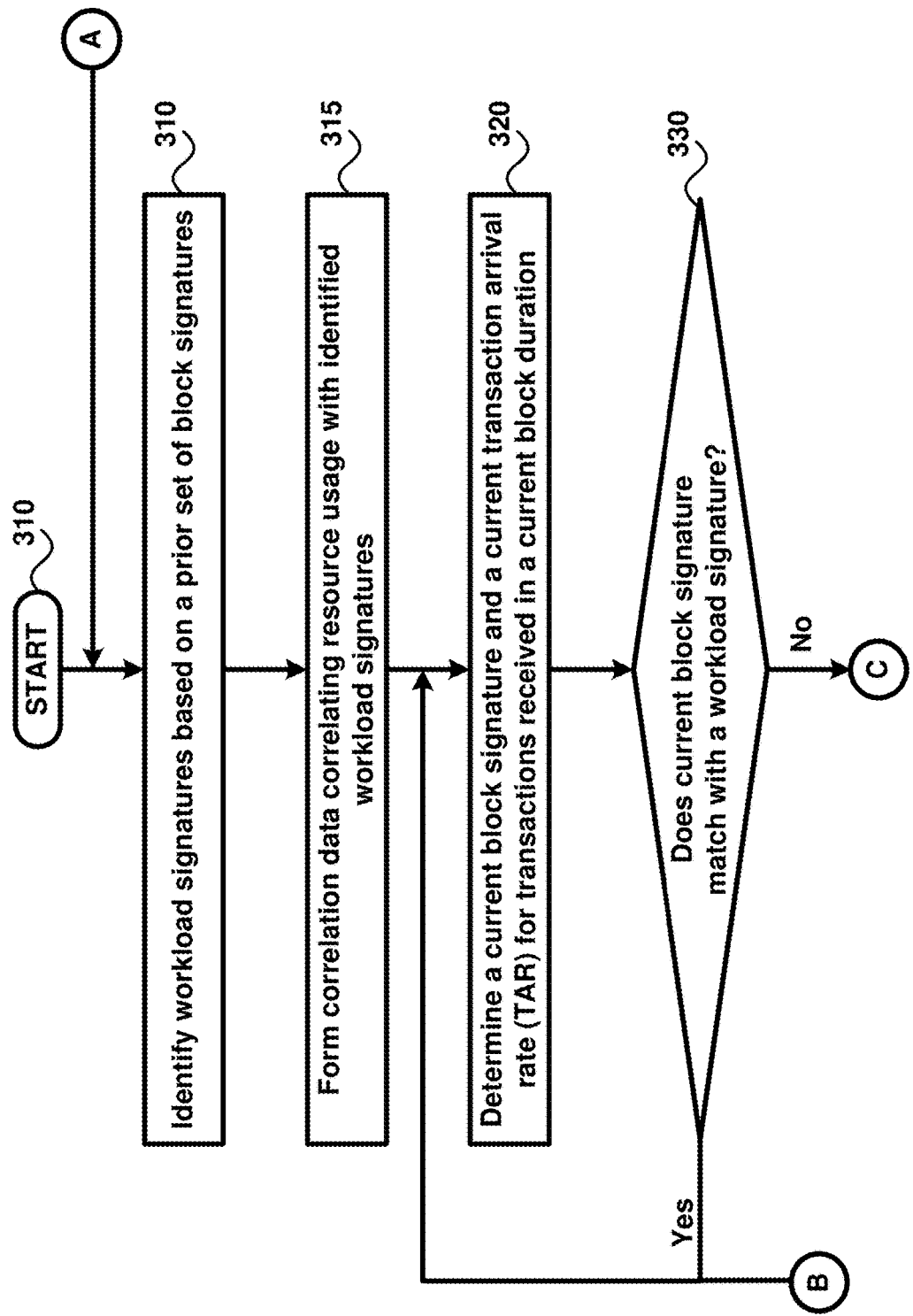
FIGS. 3A and 3B together represents a flow chart illustrating the manner in which handling of workload surges in a software application supporting multi-stage user journeys is facilitated according to aspects of the present disclosure.
Figure 3B:
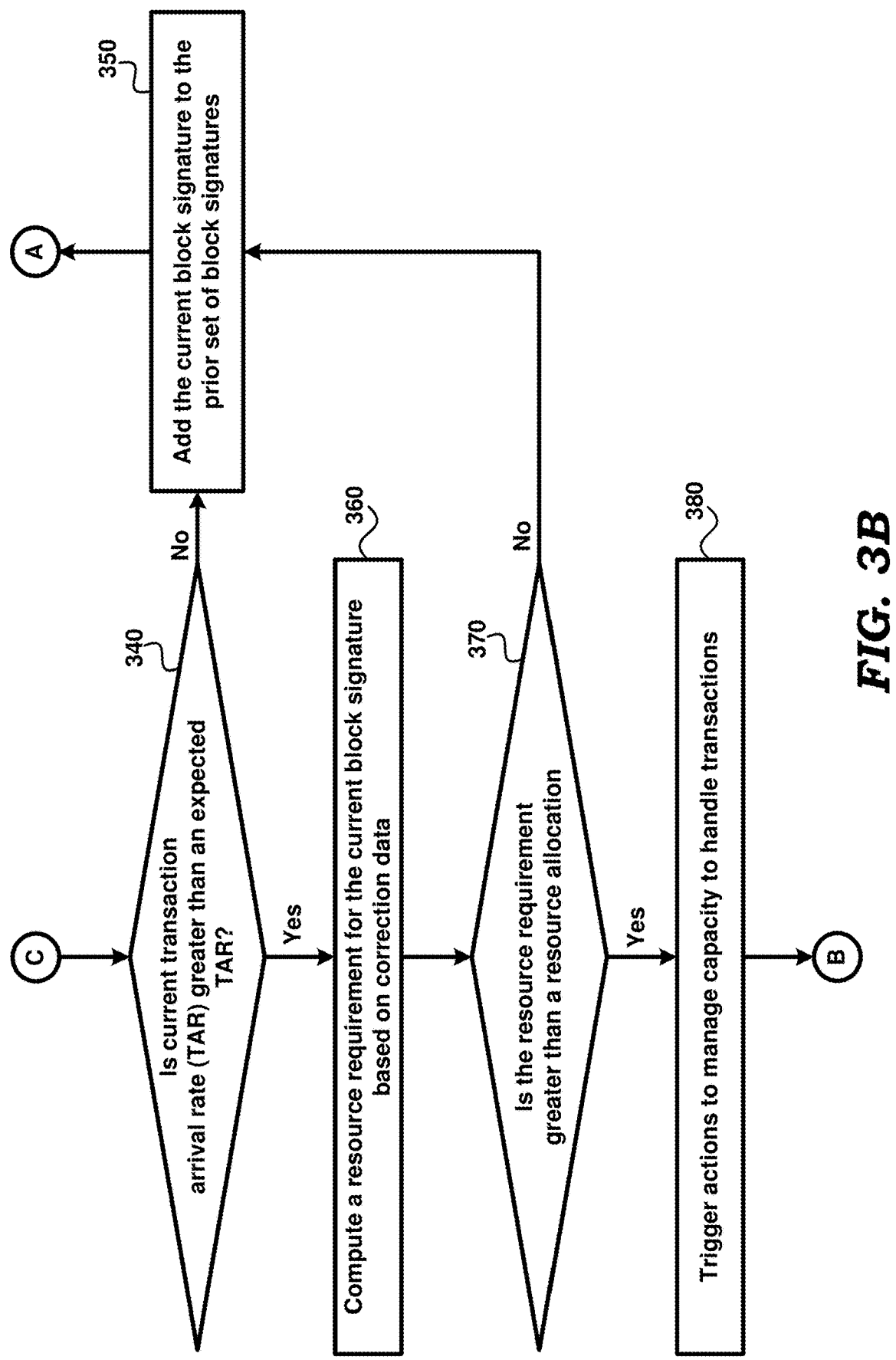

FIGS. 3A and 3B together represents a flow chart illustrating the manner in which handling of workload surges in a software application supporting multi-stage user journeys is facilitated according to aspects of the present disclosure. The flowchart is described with respect to the systems of FIGS. 1, 2A and 2B, in particular smart scaler 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301 of FIG. 3A, in which control immediately passes to step 310.

In step 310, smart scaler 150 identifies workload signatures based on a prior set of block signatures corresponding to prior block durations. A workload signature represents a corresponding cluster of workloads (in respective block durations) which are deemed to be similar based on statistical and mathematical approaches. In one embodiment, workload for each block duration is represented as a block signature indicating the number of instances of each transaction type in that block duration. A workload signature is then generated for a cluster of block signatures which are deemed to be statistically/mathematically similar.

In an embodiment, the block signature (and thus the eventual workload signature also) characterizes the workload due to the journeys initiated transactions (noted above), and in an alternative embodiment the workload due to the backend processes (e.g. batch jobs) executed in the software application in the same block duration, is included in addition.

In the description below, the block duration is assumed to be a minute, with measurements performed in smaller units (sub-block) of a second. Alternative embodiments can be employed with different durations for blocks and sub-blocks, as will be apparent to a skilled practitioner based on the disclosure provided herein.

In step 315, smart scaler 150 forms correlation data correlating resource usage with identified workload signatures. The actual resources used for each block signature may be used in forming the correlation data. The formed correlation data may be maintained internally (for example, in a hard disk within smart scaler 150) or in an external data store (not shown in FIG. 1) associated with smart scaler 150. The correlation data may be maintained in any convenient format, such as, as a table in a database server according to relational database technologies.

In step 320, smart scaler 150 determines a current block signature and a current transaction arrival rate (TAR) for transactions received in a current block duration. The determination may be performed in a known way, for example, by logging transactions occurring in each block duration and then generating the current block signature as the count of instances of each transaction type in the block duration based on the logging. The current TAR represents the total number of transaction instances (irrespective of the transactions types) received in the current block duration.

In step 330, smart scaler 150 checks whether the current block signature matches with a workload signature in the correlation data, for example, by comparing the current block signature with each of the workload signatures maintained in correlation data. In one embodiment, the current block signature is deemed to match a workload signature if the corresponding number of occurrences of transaction types in the current block signature is substantially equal (using well known statistical/mathematical approaches) to the corresponding number of occurrences of same transaction types in the workload signature.

Control passes to step 320 if a match is found (known signature), whereby the step 320 is performed again for the next block duration. Control passes to step 340 if no match is found (unknown signature).

In step 340, smart scaler 150 checks whether the current transaction arrival rate (TAR) is greater than an expected TAR. The expected TAR may be determined based on historical data, such as the total number of transactions actually received during the previous occurrences of the current block duration. For example, if the current block duration corresponds to "8:00 am to 8:01 am" on a weekday, the average total number of transactions received during the same duration during previous weekdays may be used as the expected TAR for the current block duration.

Control passes to step 360 if the current TAR is greater than the expected TAR and to step 350 otherwise. In step 350, smart scaler 150 adds the current block signature to the prior set of block signatures. Control then passes to step 310, whereby the correlation data is formed again (steps 310 and 320) incorporating the current block signature into the prior set of block signatures.

In step 360, smart scaler 150 computes a resource requirement for the current block signature based on the respective transaction instances for each transaction type in the current block signature. In general, a higher count of transaction instances for a transaction type would contribute to more resource requirement. Different transaction types may affect requirements of a specific resource more and accordingly weights also may be used in the computations of the resource requirements, as described in sections below with an example.

In an embodiment, the resource requirement is computed based on a machine learning (ML) based capacity model generated using the correlation data. The system then computes/predicts the resource requirement (for the software application as a whole) based on the ML capacity model.

In another embodiment, the resource requirement is computed based on a machine learning (ML) based usage model for each of the nodes 160 hosting the components of the software application. The computation entails predicting the node resource requirement on each of the nodes based on the ML usage model.

In step 370, smart scaler 150 compares the resource requirement with a resource allocation (currently allocated resources for the software application) to determine whether the resource requirement is greater than the resource allocation. In one embodiment, smart scaler 150 compares the node resource requirement of each node determined based on the corresponding ML usage model and the node resource (s) provisioned in that node.

Control passes to step 380 if the resource requirement is greater than the resource allocation (indicating that the currently allocated resources would be unable to handle the workload of the current block duration). Control passes to step 350 if the resource requirement is less than the resource allocation, whereby the unknown signature is added to the set of prior block signatures and the correlation data is formed again (steps 310 and 320) incorporating the current block signature into the prior set of block signatures.

In step 380, smart scaler 150 triggers actions to manage capacity to handle transaction instances received in the current block duration if the resource requirement is greater than the resource allocation. Examples of such actions include, without limitation, provisioning additional resources on the nodes (thereby increasing the processing capability of the software application), deferring batch mode processing, and throttling (or blocking) user journeys (thereby throttling the creation of workload), etc. Control passes to step 320, whereby the steps 320 through 380 are performed again for the next block duration.

It may be appreciated that actions of step 380 may be taken in real-time in the respective block durations (e.g., each minute in the illustrative embodiment). Accordingly, smart scaler 150 facilitates handling of workload surges in a software application supporting multi-stage journeys. The manner in which smart scaler 150 provides several aspects of the present disclosure according to the steps of FIG. 3 is illustrated below with examples.

6. Illustrative Example

FIGS. 4, 5, 6A-6F and 7A-7B together illustrate the manner in which handling of workload surges in a software application is facilitated in one embodiment. Each of the Figures is described in detail below.

Figure 4:
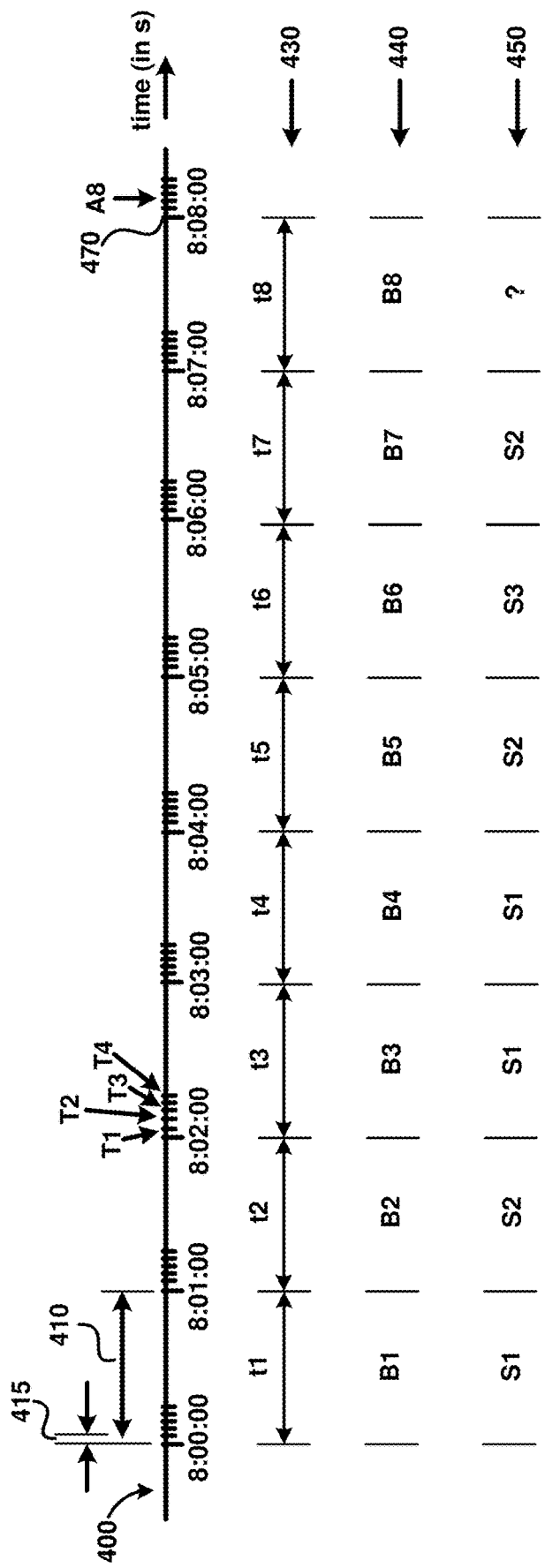
FIG. 4 depicts various timelines of operation of a software application in one embodiment.

FIG. 4 depicts various timelines of operation of a software application in one embodiment. Specifically, timeline 400 depicts the operation of a software application (e.g. online travel application) processing various transaction instances. For illustration, it is assumed that the transactions instances are received every second and accordingly timeline 400 is shown in seconds (as indicated by the 24-hour format "8:00:00").

Duration 415 represents the sub-block duration of one second, while duration 410 represents a block duration of one minute containing multiple (60) sub-block durations. Timeline 400 is shown having 8 block durations (t1 to t8) as indicated by 430. T1, T2, T3 and T4 indicate transaction instances (of corresponding transaction types) received during the block duration t3. Similarly, other transaction instances are received during the other block durations.

B1 to B8 represent the block signatures determined respectively for the block duration t1 to t8 as indicated by 440. As noted above, each block signature indicates a corresponding number of occurrences of transactions instances of each transaction type in the corresponding block duration. Thus, the block signature B3 may be determined based on the count and type of the transaction instances T1, T2, T3, and T4 received in block duration t3.

At time instance 470 (8:08:00), block durations t1 to t7 represent a prior set of block signatures based on which workload signatures may be identified and correlation data is formed. As noted above, the workload signatures are identified for a cluster of block signatures which are deemed to be statistically/mathematically similar. For example, the set of block signatures {B1, B3, B4, B8} may be determined to be similar and accordingly clustered together as a single workload signature S1. 450 indicates the workload signatures determined for each of the block durations t1 to t7. It may be readily observed that workload signatures S2 and S3 represent the cluster of block signatures {B2, B5, B7} and {B6} respectively.

At time instance 470 (8:08:00), smart scaler 150 also has collected the transaction details for a current block duration (B8) from 8:07:00 and 8:08:00, determined the current block signature B8 is an unknown signature (does not match and thereafter processes the transactions/workload according to aspects of the present disclosure. Smart scaler 150 is shown triggering an appropriate action at time instance A8 for handling the workload surge detected during the current block duration B8.

The description is continued with an example implementation of smart scaler 150 provided according to several aspects of the present disclosure.

7. Sample Implementation

Figure 5:
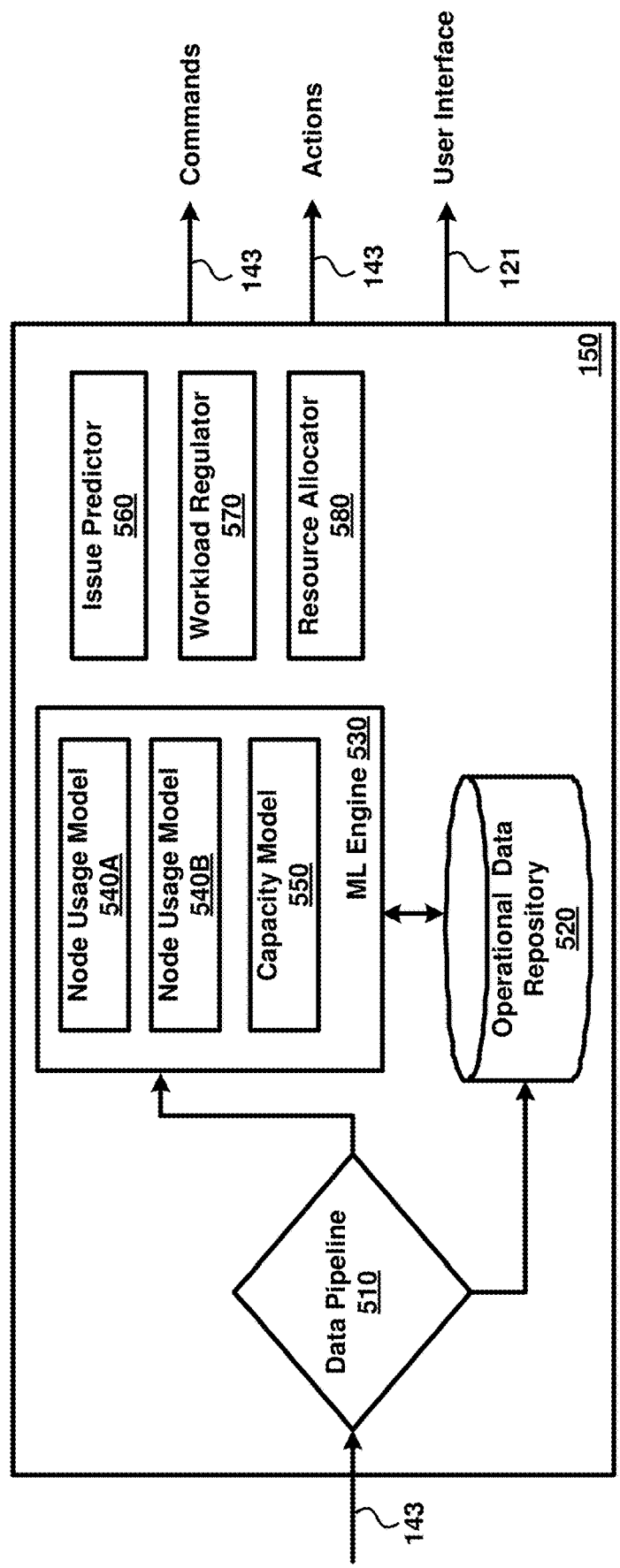
FIG. 5 is a block diagram depicting an example implementation of a smart scaler (150) in one embodiment.

FIG. 5 is a block diagram depicting an example implementation of a smart scaler (150) in one embodiment. The block diagram is shown containing data pipeline 510, operational data repository (ODR) 520 and ML engine 530 (in turn, shown containing node usage models 540A-540B and capacity model 550), issue predictor 460, workload regulator 470 and resource allocator 480. Each of the blocks is described in detail below.

Data pipeline 510 receives operational data from different nodes 160 of cloud infrastructure 130 hosting the software application (e.g. online travel application) and determines the workload signatures based on the received data. The operational data is generated by the components/IT infrastructure during execution of the components/processing of transactions. Examples of operational data include average user turnaround/response time, user input time, the number of messages between internal services in context (of processing) of a user request or transaction, the number of hops/services made by each message, a break up of time taken across internal services (referred to as trace/time trace), etc. Example operational data is shown in transaction table 610 of FIG. 6A, described in detail below.

Data pipeline 510 then generates a block signature for the corresponding block duration. In particular, the block signature indicates the corresponding number of occurrences of transactions instances of each transaction type in the corresponding block duration. Data pipeline 510 similarly receives and processes transaction tables (610) for other block durations.

Data pipeline 510 then identifies a workload signature representing a cluster of block signatures. In general, when clustering block signatures logged over a long duration (e.g., a week while block duration is a minute), fewer clusters would be realized and potentially resources used sub-optimally if a coarser parameters (distances) are chosen for clustering. On the other hand, choosing finer parameters would result in closer to optimal resource usage, but would result in more clusters.

In addition, as each cluster is characterized by a corresponding workload signature, the matching of current block signature would require fewer computations when there are fewer workload signatures (thereby enabling remedial/suitable actions in real time). A balance may accordingly be realized by choosing appropriate parameters for clustering. Well-known clustering techniques such as partitioning methods, hierarchical clustering, fuzzy clustering, density-based clustering and model-based clustering may be used to identify a workload signature. Example workload signatures are shown in signatures tables 620 of FIG. 6B, described in detail below.

Data pipeline 510 also determines (based on the operational data noted above) a total number of transactions (irrespective of transaction types) received by the software application during different block durations as the corresponding transaction arrival rates (TAR). The determined current TARs may then be compared with expected TAR for the corresponding block durations. Example expected TARs are shown in rate table 670 of FIG. 6G, described in detail below.

Data pipeline 510 also receives the details of the resources used for processing the transactions from nodes 160 of cloud infrastructure 130. The resources may be infrastructure resources such as CPU, memory, disk storage, file system, cache, etc. or may be application resources such as database connections, database cursors, threads, etc. Data pipelines 450 then forms a resource usage data that specifies the overall (of all the nodes) usage of resources by the software application during the processing of various transactions at different time instances (sub-blocks). Example resource usage data is shown in resource usage table 630 of FIG. 6C, described in detail below.

Data pipeline 510 stores tables 610, 620, 630 and 670 in ODR 520. ODR 520 represents a data store that maintains portions of operation data. Though shown internal to smart scaler 150, in alternative embodiments, ODR 520 may be implemented external to smart scaler 150, for example, in one or more of nodes 160. Data pipeline 510 also forwards the data of tables 620 and 630 to ML engine 530.

ML engine 530 generates various models that correlate the data received from data pipeline 510. The models may be generated using any machine learning approach such as KNN (K Nearest Neighbor), Decision Tree, etc. Various other machine learning approaches can be employed, as will be apparent to skilled practitioners, by reading the disclosure provided herein. In an embodiment, supervised machine learning approaches are used.

Capacity model 550 correlates overall resource usage of the software application (table 630) to different workload signatures (table 620). One approach to generating a capacity model is described in US patent entitled, "Proactive Information Technology Infrastructure Management", U.S. Pat. No. 8,903,757 B2, naming as inventor Desikachari, and Applicant as "Appnomic Systems Private Limited". Capacity model 550 is also stored in ODR 520 in the form of a signature-resource correlation table (such as 640 of FIG. 6D, described in detail below).

Node usage models 540A-540B represent ML based models generated for corresponding nodes. Each node usage model correlates the resource usage in a node with the workload signatures. In one embodiment, node usage models are generated for each node-resource combination using the approach noted above for capacity model 550. Example node resource usage is shown in node resource usage table 650 of FIG. 6E, described in detail below. The node usage tables for a resource for a node are then used by ML engine 530 to generate a node usage model (such as 540A-540B).

In one embodiment, transaction coefficients capturing the relative contribution of each transaction type to the usage of a resource is calculated based on the node usage model. One approach to calculating the transaction coefficients is described in US application entitled, "Application Behavior Learning Based Capacity Forecast Model", Publication No.: US 2015/0310139 A1, naming as inventors Desikachari et al, and Applicant as "Appnomic Systems Private Limited". The transaction coefficients are then stored in ODR 520 in the form of a transaction coefficients table (such as 660 of FIG. 6F, described in detail below). It should be appreciated that the transaction coefficients generated for each node-resource combination also are part of the correlation data (in addition to table 640) that correlates resource usage to workload signatures.

Resource allocator 480 facilitates provisioning of resources in nodes 160 for the deployment of the software application (such as online travel application). Resource allocator 480 first determines the specific resources to be provisioned based on the capacity model 550 and/or node usage models 540A-540B and a current date and time. The provisioning may be performed by sending one or more provisioning commands (via, path 143) to nodes 160. Examples of provisioning commands include, without limitation, creation of instances of components of the software application, addition of nodes (and/or VMs) hosting the software application, removal of nodes (and/or VMs), update of the components deployed on a node, migration of software components and data from one node to another node, etc.

It should be appreciated that the provisioning of the resources may be performed ahead of (prior to) the resources being consumed (during processing of transactions by the software application). For example, for timeline 400 of FIG. 4, provisioning of the resources may be performed at "7:30: 00". In the disclosure herein, the resources provisioned and available for processing of transaction in a block duration is deemed as the resource allocation in that block duration. In addition, the number of transactions that can be processed by the software application based on a current resource allocation is referred to as the capacity (of the software application) to handle transactions.

Issue predictor 460 detects anomalies (indicative of future issues) and generates notifications regarding detected anomalies The notifications may be sent to a user using end use system 110 (e.g. via path 121). One such anomaly is the occurrence of an unexpected workload surge indicated by an unknown current block signature and a higher transaction arrival rate. In one embodiment, in addition to sending notifications, issue predictor 460 also sends appropriate actions (e.g. via path 143) to manage the capacity of the software application in processing transactions. The appropriate actions may include one or more of the provisioning commands noted above.

Another appropriate action may be to defer a backend process (e.g. batch job) executing in the current block duration to a later time duration. The deferring causes resources used by the batch process to be made available for processing of the transactions during the current block duration. Such deferring may be adequate to handle some of the workload surges.

It may be appreciated that by detecting anomalies early and performing the appropriate (corrective) actions the occurrence of probable future issues may be prevented. For example, by handling unexpected workload surges, future issues such as unacceptably large response times, the software application becoming inoperable, etc. may be prevented.

Workload regulator 470 controls the number of transactions and/or transactions types (workload). Such workload regulation may prevent issues from occurring at a future time instance. One example of regulation is workload throttling which entails reducing the number of interactions (e.g. via path 121), and correspondingly the number of transactions initiated by user journeys in the future/upcoming block durations. For example, when a user is performing an interaction/transaction (such as "Search Flight"), the user may be shown a notification of the overload of the application and asked to wait for a short duration (e.g. 10 seconds) prior to initiating the transaction (e.g. clicking a "Submit" button).

In another example, the different transaction types are associated with corresponding priorities (e.g. Booking is associated with a High priority in contrast to "Search Flight" which is associated with a Medium priority). Throttling may be effected by processing transaction instances having a threshold priority (e.g. only High priority).

The description is continued with sample data that may be maintained in ODR 520 followed by the real-time operation of smart scaler 150.

8. Sample Data

FIGS. 6A through 6G depicts sample data used in the handling of workload surges in a software application supporting multi-stage journeys in one embodiment. Though shown in the form of tables, the sample data may be collected/maintained according to other data formats (such as extensible markup language (XML), etc.) and/or using other data structures (such as lists, trees, etc.), as will be apparent to one skilled in the relevant arts by reading the disclosure herein.

FIG. 6A is a real-time transaction table depicting metrics captured for various transactions that have occurred in a block duration during the operation of a software application, in one embodiment. In transaction table 610, the columns indicate the metrics captured, while the rows indicate the sub-blocks of one second in a block duration of one minute. Each cell thus indicates the value of metric captured for each sub-block in the block duration. It may be readily observed that for each transaction type (e.g. Txn_LOGIN), multiple metrics (such as average response time in column Txn_LOGIN_AvgRespTime) may be captured.

FIG. 6B is a signature table depicting the work load signatures identified for a software application in one embodiment. In signature table 620, the columns indicate the different transaction types, while each row indicates a corresponding workload signature (S1, S2, S3, etc.). Each cell indicates a corresponding number of occurrences of the transaction instances of the transaction type (indicated by the column) In signature table 625, the batch processes (e.g. Bt_Cleanup, Bt_Account) are shown as columns in addition to the transaction types. An empty cell in these columns indicates that the corresponding batch process was not executing during the processing of the transaction instances, while a value is a processing weight (e.g. value between 0 and 1) indicating the contribution of the batch process to the workload.

FIG. 6C is a real-time resource usage table depicting the usage of the resources in different sub-blocks (identical to sub-blocks in FIG. 6A) of a block duration while processing of transactions in the block duration in one embodiment. In resource usage table 630, the columns indicate the various resources used by the (components of) software application, while the rows indicate the sub-blocks of one second in a block duration of one minute. Each cell thus indicates the extent/amount of resource used for each sub-block in the block duration.

Figure 6D:
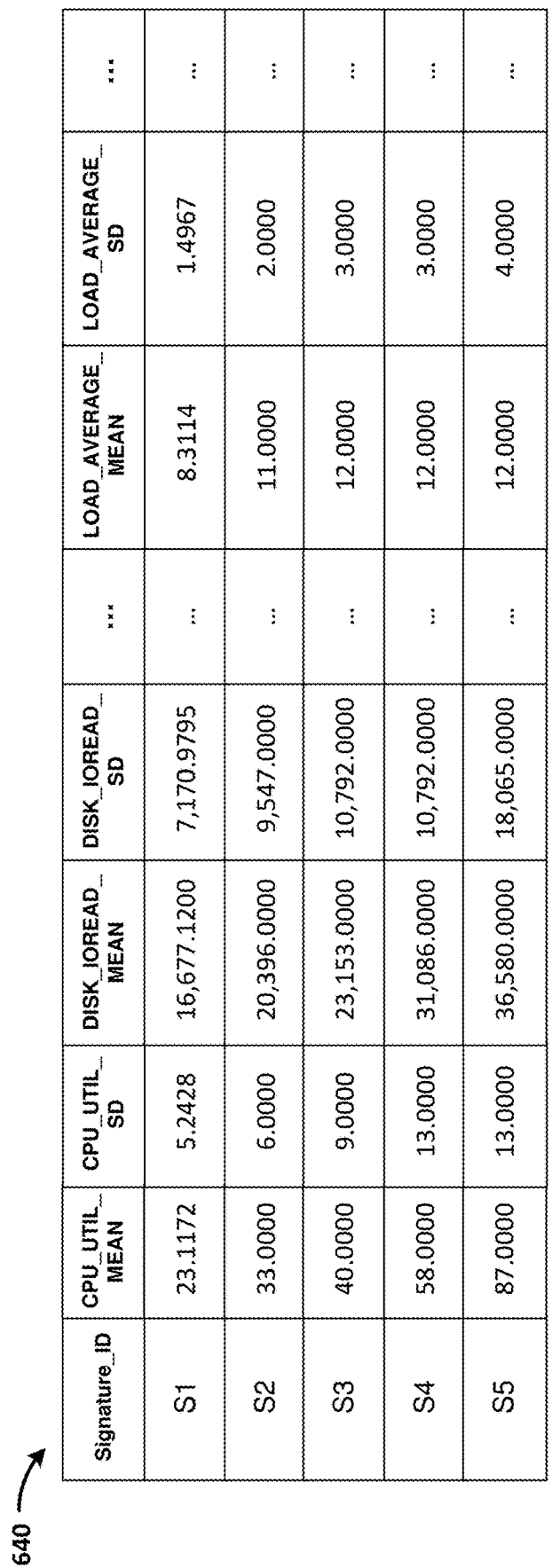
FIG. 6D is a signature-resource correlation table depicting the extent of usage of each resource while processing of transactions corresponding to each workload signature in a block duration in one embodiment.

FIG. 6D is a signature-resource correlation table depicting the extent of usage of each resource while processing of transactions corresponding to each workload signature in a block duration in one embodiment. In correlation table 640, the columns indicate the resource limits (mean and standard deviation (SD)) while the rows indicate the workload signatures. Thus, each row indicates (in statistical terms) the resource usage expected for the corresponding workload signature.

Figures 6E, 6F, 6G:
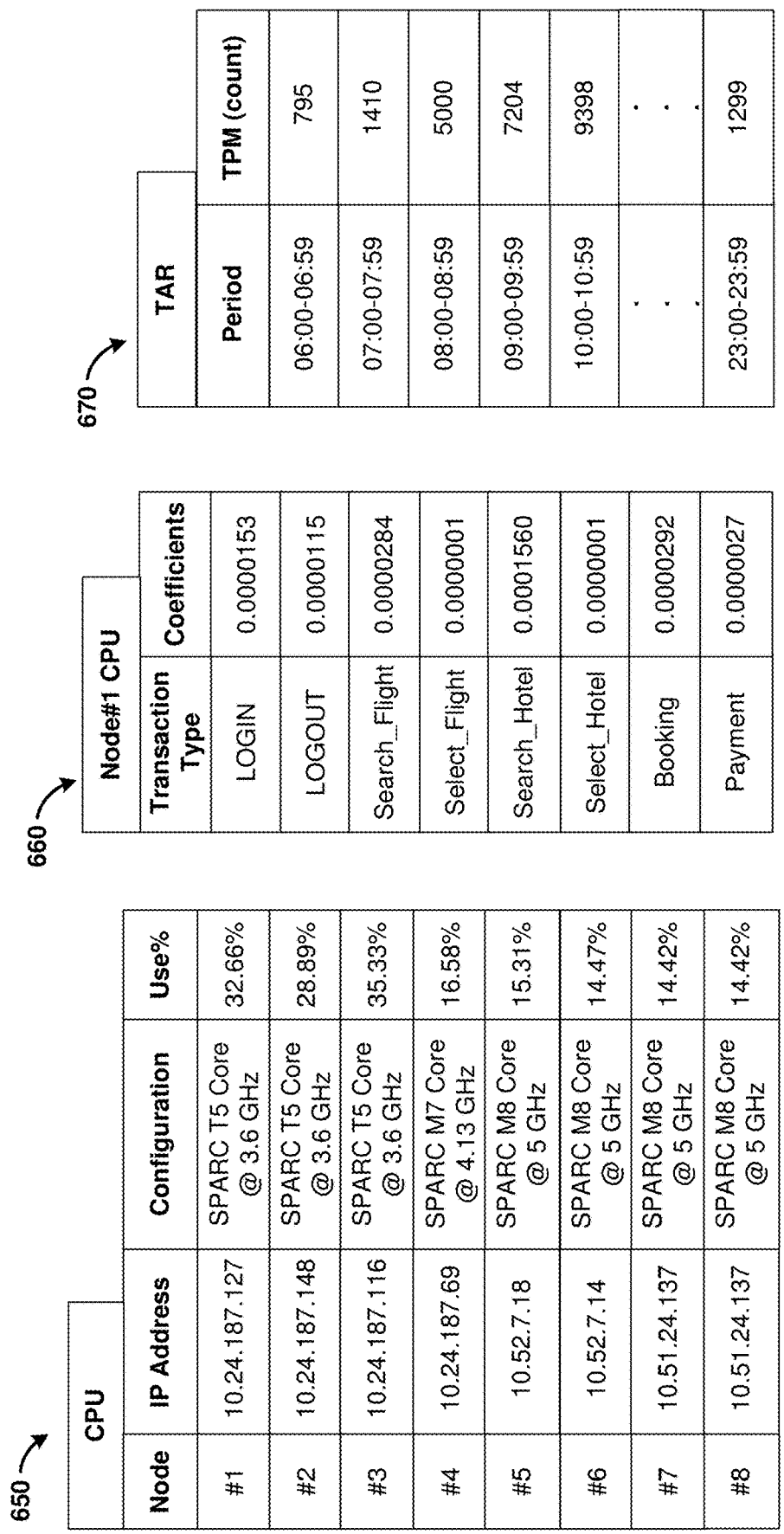
FIG. 6E is a node resource usage table depicting the extent of usage of a single resource across nodes in one embodiment.
FIG. 6F is a transaction coefficient table for depicting the coefficients for different transaction types for a single resource usage in a single node in an embodiment.
FIG. 6G is a rate table depicting the expected transaction arrival rates (TAR) in corresponding periods in an embodiment.

FIG. 6E is a node resource usage table depicting the extent of usage of a single resource across nodes in one embodiment. Table 650 depicts the usage of the resource "CPU" across multiple nodes. The rows indicate the various nodes (using their IP addresses), while the columns indicate the % of usage of the resource CPU corresponding to each node. Similar data is received and stored for different sub-blocks of the block duration.

FIG. 6F is a transaction coefficient table depicting the coefficients for different transaction types for a single resource usage in a single node in an embodiment. Specifically, table 660 depicts the transaction coefficients for the single resource "CPU" and for the node "Node #1". In table 660, the rows indicate the transaction types, while the value in the column "Coefficient" indicates the transaction coefficient corresponding to each transaction type.

FIG. 6G is a rate table depicting the expected transaction arrival rates (TAR) in corresponding periods in an embodiment. Specifically, table 670 depicts the number of transactions received by the software/online travel application during different hours of a day. It may be appreciated that the numbers noted in the "TPM(count)" column may represent a sum, average, mean or median of the number of transactions observed during the same hour during multiple prior days (historical data).

Thus, smart scaler 150 maintains various data required for handling workload surges in a software application supporting multi-stage user journeys. The manner in which smart scaler 150 uses the data to provide several aspects of the present disclosure is described below with examples.

9. Real-Time Operation

During real-time operation, smart scaler 150 receives operational data similar to that shown in transaction table 510 and then generates a current block signature for the current block duration. The block signature indicates the corresponding number of occurrences of transactions instances of each transaction type in the corresponding block duration and is similar to the signatures (S1, S2, etc.) shown in signature tables 620/625. Smart scaler 150 then checks whether the current block signature matches a workload signature in the correlation data. The match may be determined in any convenient manner, for example, based on root mean square error, well known in the relevant arts.

Upon a match being found, smart scaler 150 stops further processing for the current block duration and proceeds to (processing transactions of) the next block duration. In the timeline 400 of FIG. 4, smart scaler 150 is shown having determined a match for each of the block signatures B1 and B7, and accordingly having proceeded to the next duration.

If no match is found (e.g. for block signature B8), smart scaler 150 checks whether a current transaction arrival rate (TAR) is above an expected TAR. For the current block duration B8, smart scaler 150 determines the total number of transactions received during the current block duration t8 (current TAR), and compares the determined current TAR with the corresponding expected TAR specified for the corresponding period ("8:00-8:59") in table 670, that is, 5000 TPM (expected TAR).

If the current TAR is greater than the expected TAR, smart scaler 150 computes a resource requirement for the current block signature based on the respective transaction instances for each transaction type in the current block signature and the transaction coefficients of table 560. The resource requirement for a resource (CPU) may be computed as:

$$R = \Sigma_{type\ t} N_t C_t \qquad \text{Equation (1)}$$

Where $N_t$ is the number of transactions of the specific type t; and
$C_t$ is the transaction coefficient for the specific type t.

Smart scaler 150 then compares the determined resource requirement with a resource allocation (currently allocated resources for the software application). The comparison is performed for each combination of resource and node (hosting the software application). In one embodiment, the comparison is performed for each combination of resource and component cluster (containing multiple instances of the same component).

Smart scaler 150 (specifically issue predictor 460) then triggers appropriate actions for management of the capacity to handle transactions if the comparison determines that the resource requirement is greater than the resource allocation. Example actions that may be triggered include, without limitation, workload throttling, deferring of background processes and creating more headroom for (thereby increasing the processing capability of) the software application. Workload throttling is typically performed when the expected workload surge is showing very high consumption of a resource that is marked as "can't raise on the fly" (that is, cannot be dynamically allocated).

Deferring scheduled background processes (e.g. batch jobs) is typically performed if smart scaler 150 determines that a scheduled batch job is due to be executed, and removing the batch job can create more headroom on a resource that is expected to see high consumption. Creating more headroom (cloud like provisioning actions) is typically performed if smart scaler 150 determines that a resource expected to see high consumption can be allocated on the fly (that is, can be allocated dynamically).

In one embodiment, smart scaler 150 checks whether computing infrastructure 130 is a cloud infrastructure or an enterprise system. In the case of a hybrid infrastructure, smart scaler 150 checks whether the node on which a resource is to be allocated is part of the cloud infrastructure of the enterprise system. If the resource is determined to be hosted in a cloud infrastructure, smart scaler 150 also checks whether the resource is an infrastructure resource or an application resource. Infrastructure resource can typically be dynamically (automatically, without requiring human intervention) allocated, in contrast to application resources that typically require human intervention for provisioning.

If the resource (e.g. CPU) is determined to be an infrastructure resource hosted in a cloud infrastructure (that is, can be dynamically allocated), smart scaler 150 (specifically issue predictor 460) performs the action of provisioning (adding) the resource. Alternatively, if the resource (e.g. Database Connections) is determined to be an application resource hosted in cloud infrastructure or if the resource is hosted in the enterprise system (that is, cannot be dynamically allocated), smart scaler 150 (specifically workload regulator 470) performs the action of throttling the workload for upcoming block durations as noted above.

According to an aspect, smart scaler 150 also displays a user interface that enables a user to view the potential issues with handling of workload surges. Some sample user interfaces that may be provided by smart scaler 150 are described in detail below.

10. Sample User Interfaces

Figure 7A:
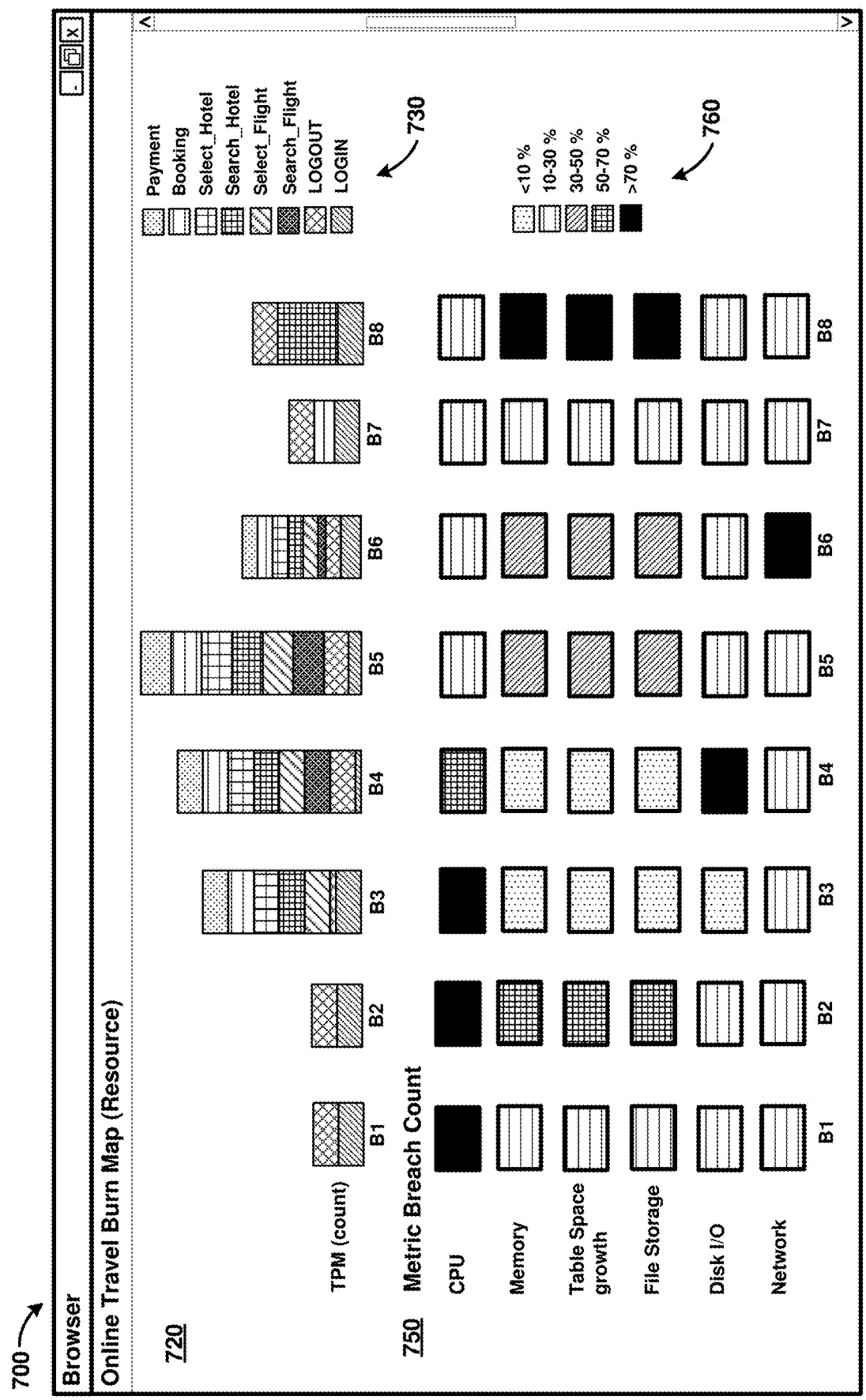
FIGS. 7A and 7B is a graphical user interface depicting a burn map used for identifying differences in resource usage/requirement of a software application in one embodiment.
Figure 7B:
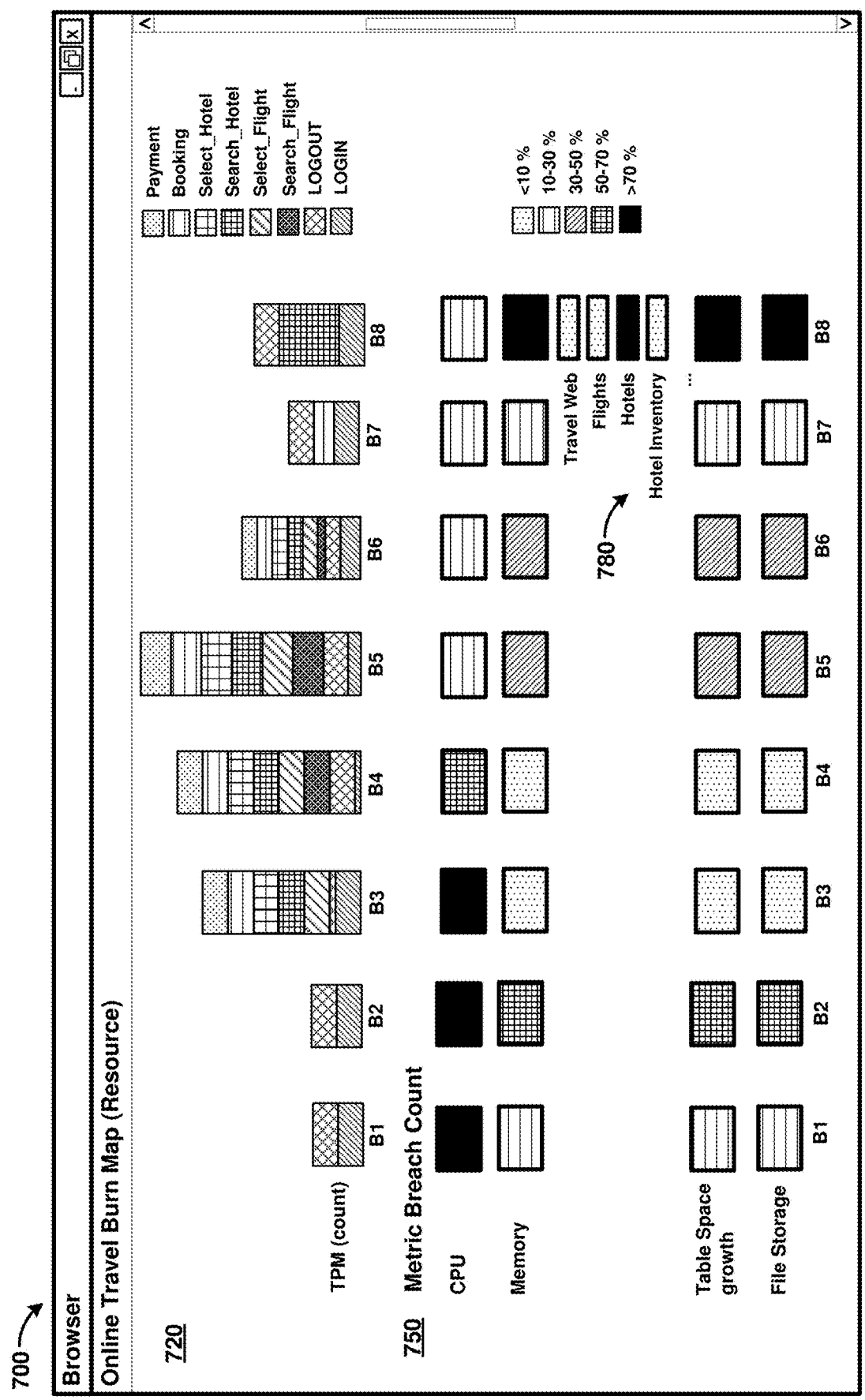

Figure FIGS. 7A and 7B is a graphical user interface depicting a burn map used for identifying differences in resource usage/requirement of a software application in one embodiment. Display area 700 represents a portion of a user interface displayed on a display unit (not shown) associated with one of end-user systems 110. In one embodiment, display area 700 corresponds to a web page rendered by a browser executing on the end-user system. Web pages are provided by smart scaler 150 in response to a user sending appropriate requests (for example, by specifying corresponding URLs in the address bar) using the browser.

Display area 700 of FIG. 7A depicts a "Online Travel Burn Map (Resource)" web page that is displayed in the browser (executing in end-user system 110-1, for illustration) in response to a user specifying a URL. Display area 750 depicts a burn map indicating the usage of various resources (CPU, Memory, File Storage, etc.) for multiple block durations (B1 to B8) including the current block duration. The resources are shown along one axis (here Y axis), while the durations are shown along another axis (here X axis). The cell rectangle at the intersection of each resource and duration indicates the usage/requirement of the resource in that duration, with the different shades/patterns in the cell rectangle indicating a corresponding range of values for the usage.

The ranges of values for each resource are chosen such that the resources whose requirements/usages are above respective thresholds for the block durations are highlighted (shown as a black filled rectangle). In one embodiment, the threshold for all the resources is chosen as 70% of the resource allocated, such that resources whose corresponding usage/requirement for a block duration exceeds 70% are highlighted with black cell rectangles. The ranges of values are then picked as shown in the legend displayed in display area 760.

In addition, display area 720 shows the workload signature determined for each of the prior block durations. For the current block duration, the current block signature is shown. Each workload/block signature is shown in the form of a stacked bar graph with the height of the stack indicating the number of transactions per minute (TPM). The specific transaction types in the workload/block signature are provided in the legend displayed in display area 730.

It may be readily appreciated that for the current block duration B8, the resources Memory, Table Space growth and File Storage are highlighted (shown as a black filled rectangle) indicating that these requirement of these resources has crossed the 70% threshold. As such, smart scaler 150 performs actions to manage capacity (e.g. cause these resources to be allocated/provisioned).

Display area 700 of FIG. 7B depicts a "Online Travel Burn Map (Component)" web page that is displayed in the browser executing in end-user system 110-1 in response to a user specifying another URL. Display areas 720 and 750 are similar to the respective reference numerals in FIG. 7A, and accordingly their description is not repeated here for conciseness. In addition, display area 750 also highlights the set of component clusters (or nodes) such as Travel Web, Flights, etc. where the requirement for a resource is above the respective thresholds for a corresponding block duration. It may be observed that for the current block duration B8, the component cluster Hotels (containing one or more instances of the Hotels service) is shown to be highlighted (shown as a black filled rectangle) indicating that these requirement of the resource "Memory" for execution of "Hotels" clusters has crossed the 70% threshold.

It may be readily appreciated that a user/administrator using the user interfaces of FIGS. 7A and 7B may determine whether or not the current resource allocation is sufficient to handle the workload in different block durations.

It should be further appreciated that the features described above can be implemented in various embodiments as a desired combination of one or more of hardware, software, and firmware. The description is continued with respect to an embodiment in which various features are operative when the software instructions described above are executed.

11. Digital Processing System

Figure 8:
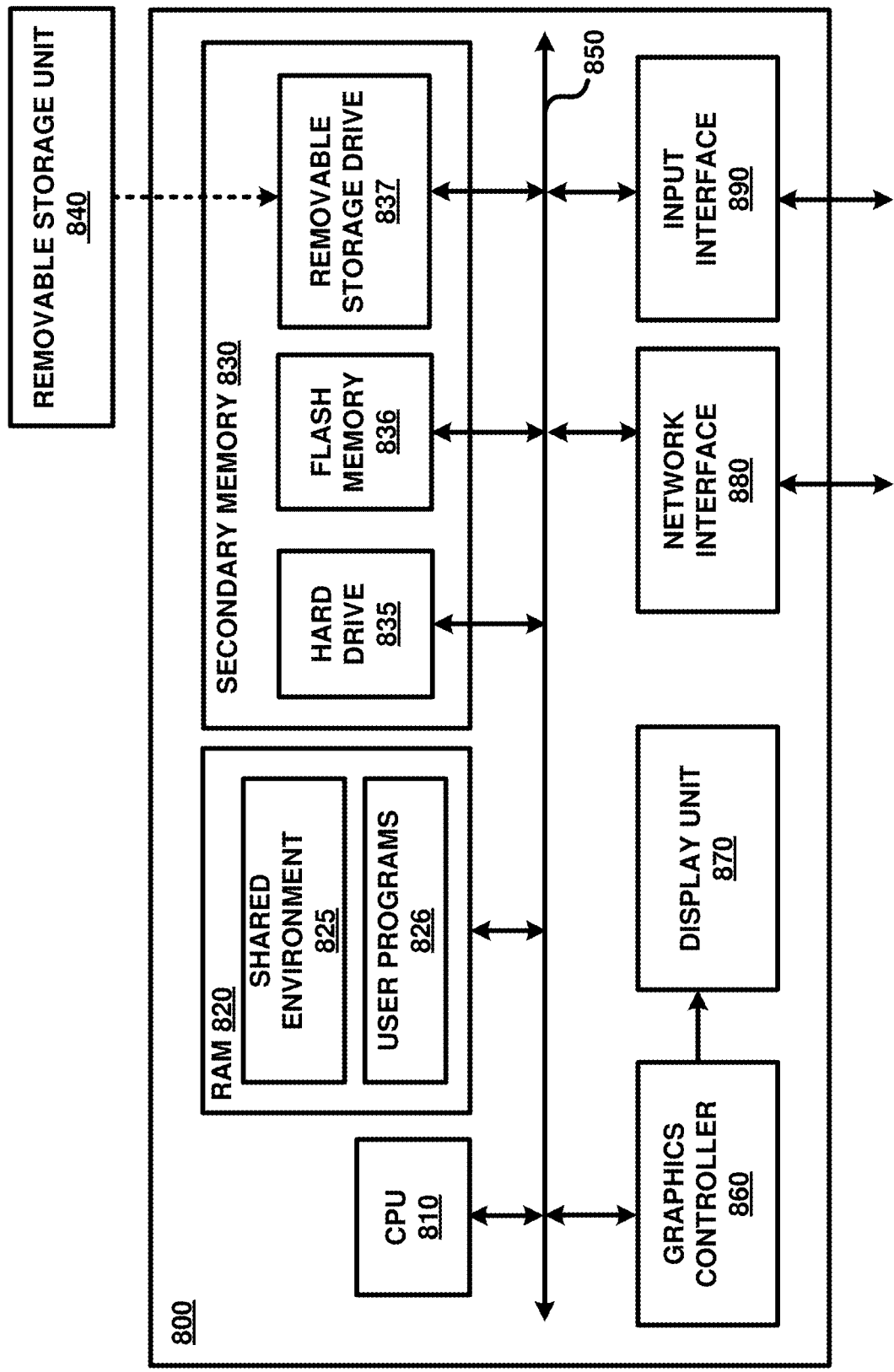
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to smart scaler 150 (or any system implementing smart scaler 150).

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, portions of the graphical user interface of FIGS. 7A-7B). Input interface 890 may correspond to a keyboard and a pointing device (e.g., touch-pad, mouse) and may be used to provide inputs (for example, the inputs required for the graphical user interface of FIGS. 7A-7B). Network interface 880 provides connectivity to a network (e.g., using Internet Protocol), and may be used to communicate with other systems connected to the networks.

Secondary memory 830 may contain hard drive 835, flash memory 836, and removable storage drive 837. Secondary memory 830 may store the data (e.g. data portions of FIGS. 6A-6F) and software instructions (e.g. for implementing the steps of FIG. 3), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

12. CONCLUSION

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for handling workload surges in a software application supporting multi-stage user journeys, wherein execution of the one or more instructions by one or more processors contained in a digital processing system causes the digital processing system to perform the actions of:
   maintaining a correlation data correlating resource usage with different workload signatures, wherein each workload signature represents a cluster of block signatures, wherein each block signature characterizes the transaction instances initiated by user journeys in a corresponding block duration;
   determining a current block signature and a current transaction arrival rate (TAR) for transactions received in a current block duration;
   if the current block signature is not contained in the correlation data and if the current TAR is greater than an expected TAR for the current block duration:
      computing a resource requirement for the current block signature based on respective transaction instances for each transaction type in the current block signature;
      comparing the resource requirement and a resource allocation in the current block duration; and
      if the comparing determines that the resource requirement is greater than the resource allocation in the current block duration, triggering actions to manage capacity to handle transaction instances.

2. The non-transitory machine readable medium of claim 1, wherein the maintaining comprises:
   identifying a plurality of workload signatures based on a prior set of block signatures corresponding to prior block durations;
   forming the correlation data for the plurality of workload signatures based on the actual resource usage in the corresponding prior block durations,
   if the current block signature is not contained in the correlation data, the method further comprising:
      if the current TAR is not greater than the expected TAR or if the resource requirement is not greater than the resource allocation, adding the current block signature to the prior set of block signatures, and performing again the identifying and the forming.

3. The non-transitory machine readable medium of claim 2, wherein each block signature indicates the corresponding number of occurrences of transactions instances of each transaction type in the corresponding block duration,
   wherein the software application comprises a plurality of components hosted on a plurality of nodes of a computing infrastructure, wherein each node provides resources for the components hosted on the node,
   wherein the computing computes a node resource requirement in the current block duration for each of the nodes,
   wherein the comparing compares the node resource requirement of each node with the node resource currently allocated in the node in the current block duration,
   wherein the triggering triggers the actions if the node resource requirement is greater than the node resource allocated for at least one node in the plurality of nodes.

4. The non-transitory machine readable medium of claim 3, wherein the correlation data is maintained for each node of the plurality of nodes, further comprising one or more instructions for:
   generating a machine learning (ML) usage model for each node-resource combination based on the correlation data,
   wherein the computing comprises predicting the node resource requirement for each of the nodes based on the ML usage model.

5. The non-transitory machine readable medium of claim 4, wherein each workload signature characterizes both of the transactions initiated by user journeys and the backend processes executed in the software application in respective block durations, wherein the current block signature further characterizes the backend processes currently executing in the software application in the current block duration,
wherein the computing is performed based on both the transactions received in the current block duration and the backend processes currently executing in the current block duration.

6. The non-transitory machine readable medium of claim 5, wherein the backend processes includes a first batch job, wherein the actions comprises deferring the first batch job executing in the current block duration to a later time duration.

7. The non-transitory machine readable medium of claim 1, further comprising one or more instructions for generating a machine learning (ML) capacity model based on the correlation data,
wherein the computing comprises predicting the resource requirement based on the ML capacity model.

8. The non-transitory machine readable medium of claim 1, wherein the triggering further comprises one or more instructions for performing the action of throttling the workload for upcoming block durations.

9. The non-transitory machine readable medium of claim 1, wherein the triggering further comprises one or more instructions for:
determining whether a first resource can be allocated dynamically;
if the first resource of the resource can be allocated dynamically, performing the action of provisioning the first resource; and
otherwise, performing the action of throttling the workload for upcoming block durations.

10. The non-transitory machine readable medium of claim 1, further comprising one or more instructions for:
displaying a burn map indicating the usage of a plurality of resources for one or more block durations including the current block duration, wherein the burn map highlights resources whose requirements were above respective thresholds in each of the one or more block durations.

11. The non-transitory machine readable medium of claim 10, wherein the burn map further highlights the set of nodes where the requirement for a resource is above the respective threshold for the resource in each of the one or more block durations.

12. The method of claim 11, wherein the triggering comprises performing the action of throttling the workload for upcoming block durations.

13. The method of claim 11, wherein the triggering comprises:
determining whether the first resource can be allocated dynamically;
if the first resource of the resource can be allocated dynamically, performing the suitable action of provisioning the difference of the first resource; and
otherwise, performing the suitable action of throttling the workload for upcoming block durations.

14. A method for handling workload surges in a software application supporting multi-stage user journeys, the method comprising:
maintaining a correlation data correlating resource usage with different workload signatures, wherein each workload signature represents a cluster of block signatures, wherein each block signature characterizes the transaction instances initiated by user journeys in a corresponding block duration;
determining a current block signature and a current transaction arrival rate (TAR) for transactions received in a current block duration;
if the current block signature is not contained in the correlation data and if the current TAR is greater than an expected TAR for the current block duration:
computing a resource requirement for the current block signature based on respective transaction instances for each transaction type in the current block signature; and
comparing the resource requirement to a resource allocation in the current block duration; and
if the comparing determines that the resource requirement is greater than the resource allocation in the current block duration, triggering actions to manage capacity to handle transaction instances.

15. The method of claim 14, wherein the maintaining comprises:
identifying a plurality of workload signatures based on a prior set of block signatures corresponding to prior block durations;
forming the correlation data for the plurality of workload signatures based on the actual resource usage in the corresponding prior block durations,
if the current block signature is not contained in the correlation data, the method further comprising:
if the current TAR is not greater than the expected TAR or if the resource requirement is not greater than the resource allocation, adding the current block signature to the prior set of block signatures, and performing again the identifying and the forming.

16. The method of claim 15, wherein each block signature indicates the corresponding number of occurrences of transactions instances of each transaction type in the corresponding block duration,
wherein the software application comprises a plurality of components hosted on a plurality of nodes of a computing infrastructure, wherein each node provides resources for the components hosted on the node,
wherein the computing computes a node resource requirement in the current block duration for each of the nodes,
wherein the comparing compares the node resource requirement of each node with the node resource currently allocated in the node in the current block duration,
wherein the triggering triggers the actions if the node resource requirement is greater than the node resource allocated for at least one node in the plurality of nodes.

17. The method of claim 16, wherein the correlation data is maintained for each node of the plurality of nodes, the method further comprising:
generating a machine learning (ML) usage model for each node-resource combination based on the correlation data,
wherein the computing comprises predicting the node resource requirement for each of the nodes based on the ML usage model.

18. The method of claim 17, wherein each workload signature characterizes both of the transactions initiated by user journeys and the backend processes executed in the software application in respective block durations,
wherein the current block signature further characterizes the backend processes currently executing in the software application in the current block duration, wherein the computing is performed based on both the transactions received in the current block duration and the backend processes currently executing in the current block duration.

19. The method of claim 18, wherein the backend processes includes a first batch job, wherein the action comprises deferring the first batch job executing in the current block duration to a later time duration.

20. A digital processing system comprising:
a random access memory (RANI) to store instructions; and
one or more processors to retrieve and execute the instructions, wherein execution of the instructions causes the digital processing system to perform the actions of:
  maintaining a correlation data correlating resource usage with different workload signatures, wherein each workload signature represents a cluster of block signatures, wherein each block signature characterizes the transaction instances initiated by user journeys in a corresponding block duration;
  determining a current block signature and a current transaction arrival rate (TAR) for transactions received in a current block duration;
  if the current block signature is not contained in the correlation data and if the current TAR is greater than an expected TAR for the current block duration:
    computing a resource requirement for the current block signature based on respective transaction instances for each transaction type in the current block signature;
    comparing the resource requirement and a resource allocation in the current block duration; and
    if the comparing determines that the resource requirement is greater than the resource allocation in the current block duration, triggering actions to manage capacity to handle transaction instances.

21. The digital processing system of claim 20, wherein for the maintaining, the digital processing system performs the actions of:
  identifying a plurality of workload signatures based on a prior set of block signatures corresponding to prior block durations;
  forming the correlation data for the plurality of workload signatures based on the actual resource usage in the corresponding prior block durations,
  if the current block signature is not contained in the correlation data, the method further comprising:
    if the current TAR is not greater than the expected TAR or if the resource requirement is not greater than the resource allocation, adding the current block signature to the prior set of block signatures, and performing again the identifying and the forming.

22. The digital processing system of claim 21, wherein each block signature indicates the corresponding number of occurrences of transactions instances of each transaction type in the corresponding block duration,
  wherein the software application comprises a plurality of components hosted on a plurality of nodes of a computing infrastructure, wherein each node provides resources for the components hosted on the node,
  wherein the digital processing system computes a node resource requirement in the current block duration for each of the nodes,
  wherein the digital processing system compares the node resource requirement of each node with the node resource currently allocated in the node in the current block duration,
  wherein the digital processing system triggers the actions if the node resource requirement is greater than the node resource allocated for at least one node in the plurality of nodes.

* * * * *